United States Patent
McCallam et al.

(10) Patent No.: US 7,698,738 B2
(45) Date of Patent: Apr. 13, 2010

(54) SYSTEM AND METHOD FOR REAL-TIME NETWORK-BASED RECOVERY FOLLOWING AN INFORMATION WARFARE ATTACK

(75) Inventors: Dennis Hain McCallam, Reisterstown, MD (US); Ronald Kenneth Newland, Sun City, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1297 days.

(21) Appl. No.: 10/437,019

(22) Filed: May 14, 2003

(65) Prior Publication Data

US 2004/0230832 A1 Nov. 18, 2004

(51) Int. Cl.
G06F 11/00 (2006.01)
G06F 12/14 (2006.01)
G06F 12/16 (2006.01)
G08B 23/00 (2006.01)

(52) U.S. Cl. ...................................... 726/22
(58) Field of Classification Search ........................ None
See application file for complete search history.

(56) References Cited

U.S. PATENT DOCUMENTS

| | | | |
|---|---|---|---|
| 5,513,343 A * | 4/1996 | Sakano et al. ............... 714/26 |
| 6,252,963 B1 | 6/2001 | Rhoads | |
| 6,301,360 B1 | 10/2001 | Bocionek et al. | |
| 6,314,192 B1 | 11/2001 | Chen et al. | |
| 6,442,694 B1 * | 8/2002 | Bergman et al. ............... 726/22 |
| 6,463,579 B1 * | 10/2002 | McKinsey ................... 717/146 |
| 7,350,234 B2 * | 3/2008 | Goseva-Popstojanova et al. ............................ 726/23 |
| 2002/0059528 A1 * | 5/2002 | Dapp .......................... 713/201 |
| 2002/0066034 A1 * | 5/2002 | Schlossberg et al. ......... 713/201 |
| 2002/0112190 A1 * | 8/2002 | Miyagawa et al. ........... 713/201 |
| 2002/0166063 A1 * | 11/2002 | Lachman et al. ............. 713/200 |
| 2004/0015719 A1 * | 1/2004 | Lee et al. ..................... 713/201 |
| 2004/0034800 A1 * | 2/2004 | Singhal et al. ............... 713/201 |
| 2004/0260947 A1 * | 12/2004 | Brady et al. ................. 713/201 |

* cited by examiner

Primary Examiner—Emmanuel L Moise
Assistant Examiner—Nadia Khoshnoodi
(74) Attorney, Agent, or Firm—Andrews Kurth LLP

(57) ABSTRACT

A method, and a corresponding apparatus, provide for real-time network-based recovery from information warfare (IW) attacks on a network that includes subnets, with each subnet including one or more nodes. The method includes executing a pre-IW attack routine to identify IW attack recovery information, in response to an IW attack, executing an IW attack response routine, and executing a real-time network-based recovery routine. The pre-IW attack routine includes monitoring conditions on the network and at each of the subnets and nodes. When an IW attack occurs at an entity in the network, a condition flags are set to indicate the specific entity or entities being attacked. A condition flag set to 0 implies full operational capability of the entity, a condition flag set to 1 implies recent IW attack or IW attack in progress at the entity, and a condition flag set to 2 implies recovery of the entity from the IW attack.

27 Claims, 22 Drawing Sheets

| NAME | DEFINITION | VALUES/MEANING |
|---|---|---|
| DATACON(i) | RELATES TO THE CONDITION OF DATA THAT IS CONTAINED IN A SPECIFIC PORTION OF THE NETWORK AS DEFINED BY i. I = 1 RELATES TO A NODE 101 ON THE LAN 100. I = 3, RELATES TO THE ENTIRE LAN 100. | = 0 IMPLIES THAT THE DATA AT AN ENTITY IS ENTIRELY OPERATIONAL AND NOT AFFECTED<br>= 1 IMPLIES THAT THE DATA WITHIN THE ENTITY IS (OR HAS RECENTLY BEEN) UNDER ATTACK<br>= 2 IMPLIES RECOVERY OF THE DATA IS OCCURRING |
| NODECON(i) | RELATES THE OPERATIONAL CONDITION OF THE $i^{th}$ NODE 101 ON THE LAN 100 | = 0 IMPLIES THAT THE DATA IS ENTIRELY OPERATIONAL AND NOT AFFECTED<br>= 1 IMPLIES THAT THE DATA IS (OR HAS RECENTLY BEEN) UNDER ATTACK<br>= 2 IMPLIES RECOVERY OF THE DATA IS OCCURRING |
| SUBNETCOM(i) | RELATES THE OPERATIONAL CONDITION OF THE $i^{th}$ SUBNET 103 | =0 IMPLIES THAT THE DATA AT THE $i^{th}$ SUBNET IS ENTIRELY OPERATIONAL AND NOT AFFECTED<br>= 1 IMPLIES THAT THE DATA WITHIN THIS ENTITY IS (OR HAS RECENTLY BEEN) UNDER ATTACK<br>= 2 IMPLIES RECOVERY OF THE DATA IS OCCURRING |
| NETCON | | = 0 IMPLIES THAT THE LAN 100 IS OPERATIONAL<br>= 2 IMPLIES RECOVERY OF THE LAN 100 IS OCCURRING |

FIG. 4

SYSTEM AND METHOD FOR REAL-TIME NETWORK-BASED RECOVERY FOLLOWING AN INFORMATION WARFARE ATTACK

TECHNICAL FIELD

The technical field is systems and processes designed to protect the security of computer information, and restore full operational capability to a computer network following an information warfare attack.

BACKGROUND

A personal computer and a modem access to the Internet are all the tools that a computer hacker needs to conduct a cyber attack on a computer system. The rapid growth of a computer-literate population provides millions of people the opportunity to possess the skills necessary to conduct a cyber attack. The computer literate population includes recreational hackers who attempt to gain unauthorized electronic access to information and communication systems. These computer hackers are often motivated only by personal fascination with hacking as an interesting game. Criminals, and perhaps organized crime, might also attempt personal financial gain through manipulation of financial or credit accounts or stealing services. Industrial espionage can also be the reason for a cyber attack on a competitor's computer system. Terrorists may attempt to use the computer infrastructure. Other countries may use the computer infrastructure for national intelligence purpose. Finally, there is the prospect of information warfare, which is a broad, orchestrated attempt to disrupt a United States military operation, critical infrastructure(s), or significant economic activity.

A typical secure computer network has an interface for receiving and transmitting data between the secure network and computers outside the secure network. The interface may be a modem or an Internet Protocol (IP) router. Data received by the modem passes through a firewall, which is a network security device that only allows data packets from a trusted computer to be routed to specific addresses within the secure computer network. Although the typical firewall is adequate to prevent outsiders from accessing a secure network, hackers and others can often breach a firewall. An entry by an unauthorized user into the secure computer network, past the firewall, from outside the secure computer network is an intrusion. As can be appreciated, new ways of overcoming the security devices are developed every day.

Another type of unauthorized operation is insider misuse, which is an unauthorized access from a computer within the secure computer network. In insider misuse, the firewall is not breached. Instead, the unauthorized operation occurs from inside the secure computer network. For example, an unauthorized user could obtain the password of an authorized user, logon to the secure computer network from the authorized user's computer, and attempt to perform operations not typically associated with the authorized user.

Security and intrusion detection systems exist that can determine if very specific and well known types of breaches of computer security are occurring. These computer security systems passively collect audit information from network devices and format those audits for later review. Known attack signatures can be identified, but new attacks cause these systems significant problems since the identification of a new attack often needs to have human intervention and assistance. Furthermore these computer security systems do not take steps to stop the misuse or intrusion after it is detected. Security systems that do take active steps are limited to logging a user off the network, stopping communications with that computer, halting operations and shutting down and restarting the computer system, and notifying security personnel of the breach, often by e-mail message.

Once an intruder gains access to information on the secure computer network, the intruder can compromise information on the network such that an extensive recovery process will be required if all the compromised information is to be recovered. For example, if the secure computer network is subjected to an information warfare (IW) attack, then restoration of the secure computer network to full operational capability may involve shutdown of the secure computer network, and a time-consuming restart. Intruders may be able to take advantage of the down-time associated with recovery by physically attacking assets associated with the secure computer network. Existing computer security systems are not capable of rapidly returning a compromised secure computer network to even a minimal level of operation, let alone to full operational capability.

SUMMARY

What is disclosed is a method for real-time network-based recovery from information warfare (IW) attacks on a network comprising subnets, each subnets, each subnet comprising nodes, the method. The method begins with executing a pre-IW attack routine to identify IW attack recovery information. The pre-IW attack routine includes discovering recovery information in the network, collecting the discovered recovery information, and processing the collected recovery information. The processing routine includes hiding the collected recovery information, recording timing of events in the network, and monitoring the network for attack indications. The method continues with executing an IW attack response routine and executing a real-time network-based recovery routine.

Also disclosed is method for monitoring a computer network having subnets and nodes, where the method includes monitoring the network to determine a network data condition, monitoring the subnets to determine subnet data conditions, monitoring the nodes to determine node data conditions, and setting condition flags indicative of data conditions at the network, subnets and nodes.

Further, what is disclosed is a method for describing a condition of a computer network susceptible to an information warfare (IW) attack, the network including subnets, each of the subnets including nodes. The method includes monitoring the network, the subnets, and the nodes and setting condition flags upon a change in status at one or more of the network, the subnets, and the nodes. Setting the condition flags includes setting a network condition flag, setting subnet condition flags, and setting node condition flags. A setting of 0 indicates operational status, a setting of 1 indicates IW attack, and a setting of 2 indicates recovery from the IW attack. Following setting of the condition flags, the method invokes real-time network-based recovery routines based on the setting of the condition flags.

Still further what is disclosed is an apparatus for real-time network-based recovery from an information warfare attack on a network including subnets, and the subnets including nodes. The apparatus includes a service manager that discovers available information for recovery from the IW attack, an data analyzer that determines required recovery information based on the available information, an agent manager that collects the required recovery information, condition flags at each of the network, the subnets and the nodes, and a recovery manager that invokes recovery routines in an event of the IW attack, the recovery manager including a detection manager that determines conditions on each of the network, the subnets, and the nodes. The conditions indicate one of operational, under IW attack, and recovery from IW attack. The detection manager reads the condition flags set at each of the network, the subnets and the nodes.

DESCRIPTION OF THE DRAWINGS

The detailed description will refer to the following drawings, in which like numerals refer to like objects, and in which:

FIG. 4 illustrates the concept of network-based recovery following an information warfare attack;

DETAILED DESCRIPTION

Figure 1:
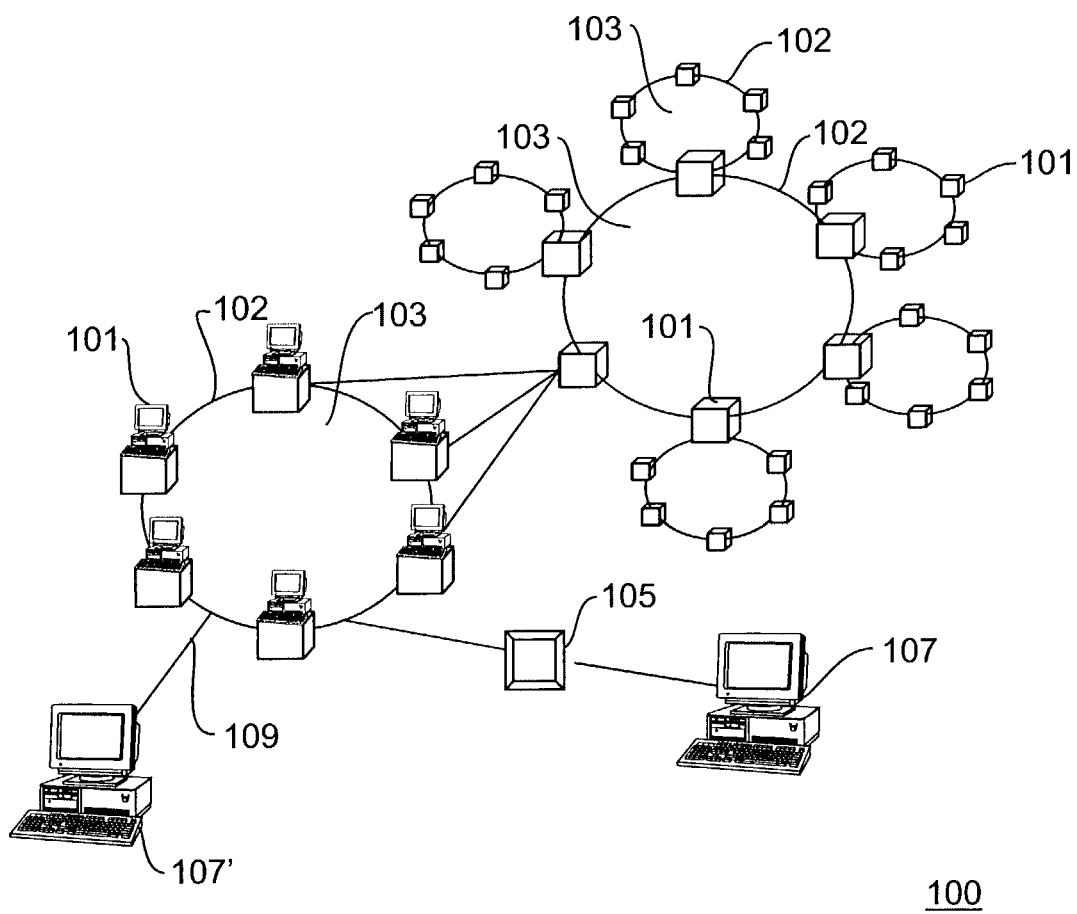
FIG. 1 illustrates a distributed computer network that embodies the concepts of real-time recovery of compromised information.

Many distributed computer system networks are subject to an information warfare (IW) attack and compromise of information. FIG. 1 illustrates such a network, configured as a local area network (LAN) 100, for example, which may be subject to IW attack. The LAN 100 includes multiple network devices 101, which are located at nodes on the network 100. The devices 101 are linked by links 102 into subnets 103, and a series of subnets 103 forms the LAN 100. The devices 101 may be local client processors, such as servers and personal computers, for example. The LAN 100 may be an ARCnet, an Ethernet, and a Token-Ring network. The LAN 100 may also be wireless. The links 102 in the LAN 100 may be of any known physical configuration including unshielded twisted pair (UTP) wire, coaxial cable, shielded twisted pair wire, fiber optic cable, for example. Alternatively, the links 103 may be wireless links. The LAN 100 may also include dial-up remote access using a modem 105 to a remote client 107, and a dedicated port 109 to a remote client 107'.

Figure 2:
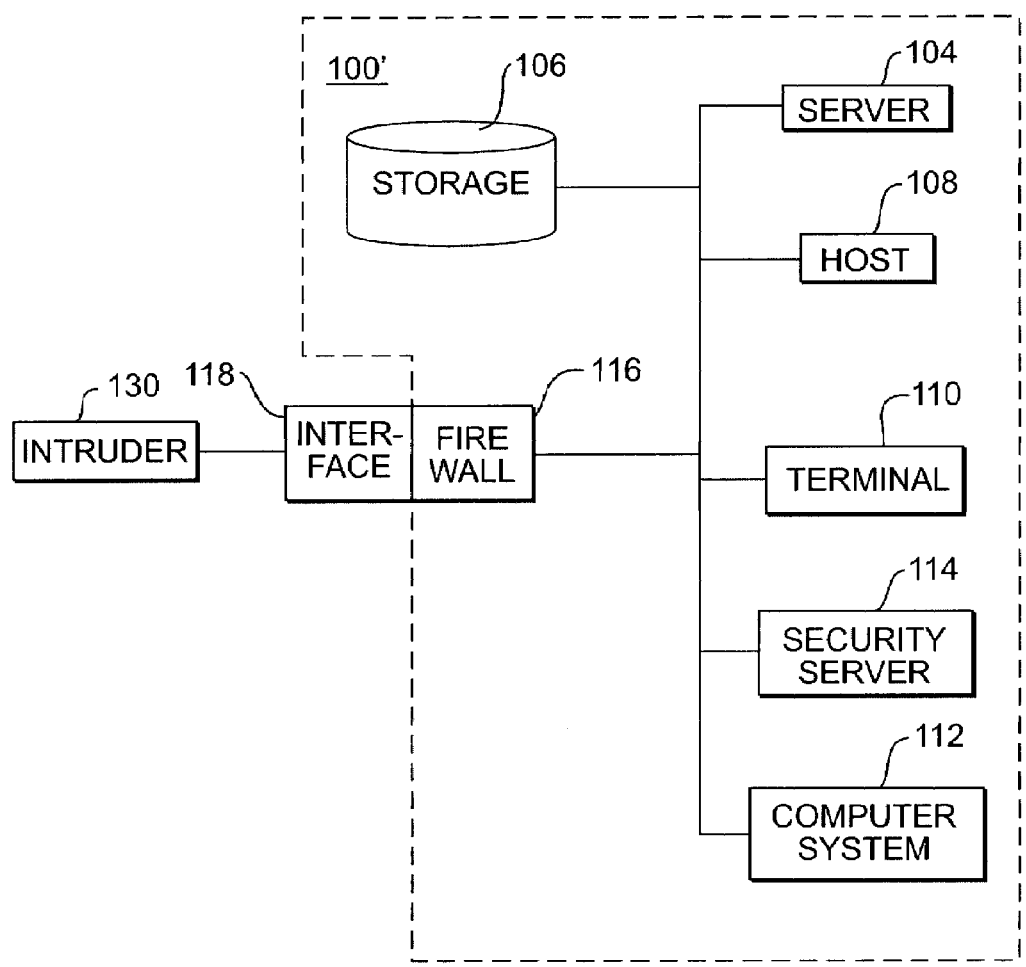
FIG. 2 is a diagram of a portion of the network of FIG. 1.

FIG. 2 is a diagram of a portion 100' of the LAN 100 showing specific features related to real-time network-based recovery from an IW attack. The LAN portion 100' includes, as network devices 101, a network database server 104, a database 106, a host computer 108, a terminal 110, and a computer system 112. Each network device 104, 106, 108, 110, 112 can also be considered a node because each network device has an addressable interface on the LAN 100. As can be appreciated, many other devices can be coupled to the LAN 100 including personal computers, servers, mini-mainframe computers, mainframe computers, and other devices not illustrated or described, but which are well known in the art.

The computer system 112 may be any of personal computers, mini-mainframes, mainframes and the like. Although the computer system 112 is shown in FIG. 2 as a network device that is part of a wired local network, the computer system 112 may also be connected to the LAN 100 by a wireless link. In this regard, the computer system 112 is usable in mobile environments.

Also shown is security server 114 for implementing intrusion detection, suppression, countermeasures, and recovery from an IW attack. The security server 114 will be described in more detail with reference to FIG. 3. A firewall 116 connects the LAN portion 100' to an interface 118. The firewall 116 is a combination hardware and software buffer that is between the LAN portion 100' and devices external to the LAN portion 100'. The network devices 101 within the LAN portion 100' appear within the dashed lines in FIG. 2, and external devices appear outside the dashed lines. The firewall 116 allows only specific kinds of messages from external devices to flow in and out of the LAN portion 100'. As is known in the art, firewalls are used to protect networks such as the LAN 100 from intruders or hackers who might try to break into the LAN 100. The interface 118 is external to the LAN 100 and can be a modem or an Internet Protocol (IP) router, for example. The interface 118 serves to connect the LAN 100 to devices outside the LAN 100. For illustrative purposes, an intruder computer system is shown at 130.

Figure 3:
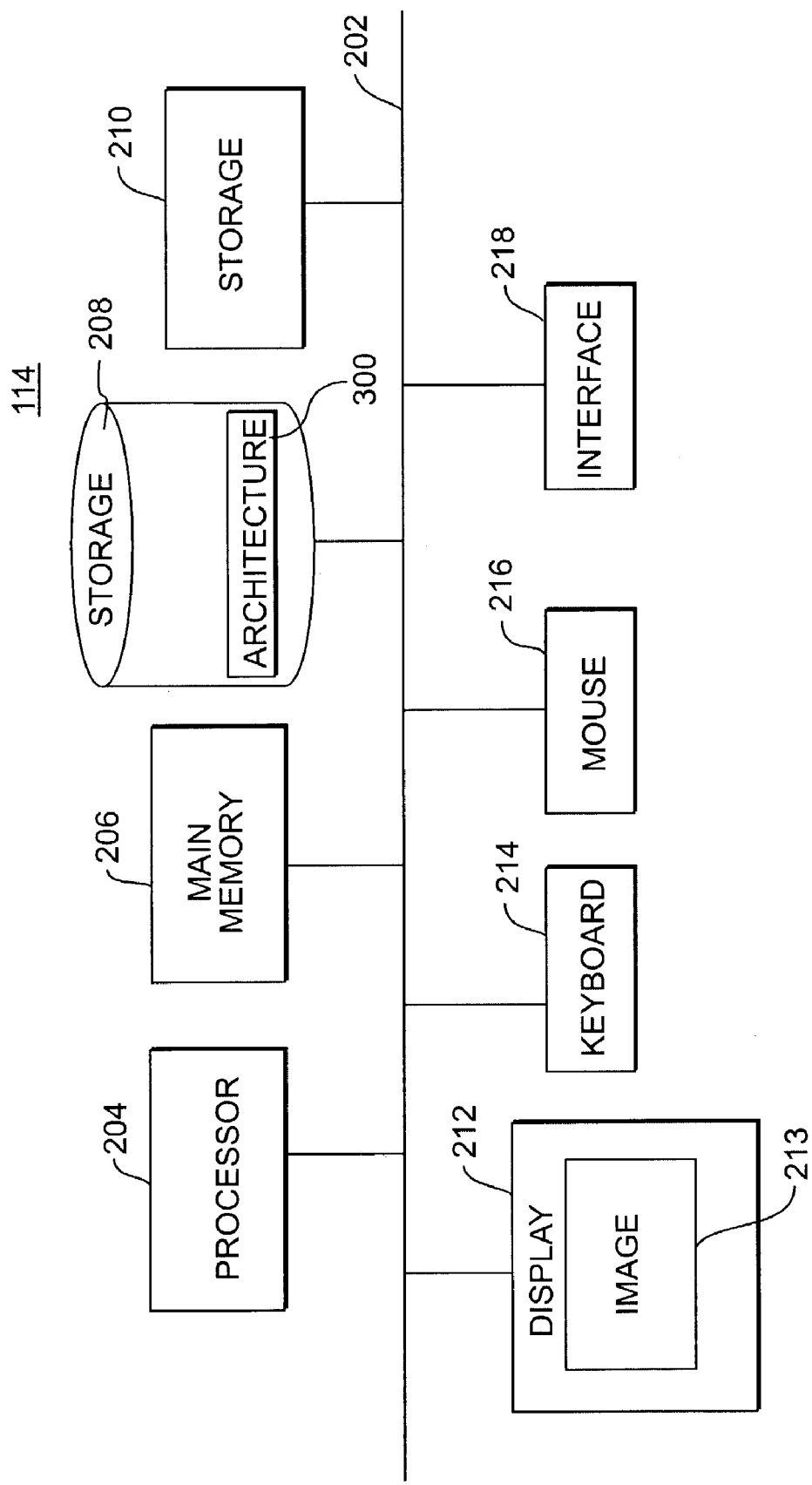
FIG. 3 is a block diagram of a security system used with the network portion of FIG. 2.

FIG. 3 is a block diagram illustrating an exemplary system, such as the security server 114 shown in FIG. 2, which is usable on the LAN 100. The security server 114 includes a bus 202 or other communication mechanism for communicating information, and a processor 204 coupled to the bus 202 for processing information. The security server 114 also includes a main memory 206, such as a random access memory (RAM) or other dynamic storage device, coupled to the bus 202 for storing information and instructions to be executed by the processor 204. The main memory 206 also may be used for storing temporary variables or other intermediate information during execution of instructions by the processor 204. The security server 114 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

As shown in FIG. 3, the ROM 208 includes a recovery architecture 300 that the processor 204 implements for real-time network-based recovery from an IW attack. Although the recovery architecture 300 is shown as stored in the ROM 208, the recovery architecture 300 could also be stored in other memory or storage devices of the security server 114. The recovery architecture 300 will be described in detail later.

The security server 114 may be coupled using the bus 202 to a display 212, such as a cathode ray tube (CRT) or a flat panel display, for displaying information to a human operator. As will be described later, the display 212 may display a graphical image 213 that is used in conjunction with the recovery architecture 300 to "hide" certain recovery information that the recovery architecture 300 will use in the event of a real-time network based recovery from an IW attack. The graphical image 213 may be stored in a storage or memory device of the security server 114. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212.

The processor 204 can execute sequences of instructions contained in the main memory 206. Such instructions may be read into main memory 206 from another computer-readable medium, such as the storage device 210. However, the computer-readable medium is not limited to devices such as the storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the IW pre-attack, IW response, and IW post-attack routines described below. In alternative embodiments, hard-wired circuitry may be used in place of or in combination with software instructions. Thus, the embodiments described herein are not limited to any specific combination of hardware circuitry and software.

The security server 114 also includes a communication interface 218 coupled to the bus 202. The communication interface 218 provides two-way data communication. For example, the communication interface 218 may be an integrated services digital network (ISDN) card or a modem to provide a data communication connection to a corresponding type of telephone line. As another example, the communication interface 218 may be a local area network (LAN) card to provide a data communication connection to the LAN 100. In an embodiment, the communication interface 218 is wired to the LAN 100. Wireless links may also be implemented. In any such implementation, the communication interface 218 sends and receives electrical, electromagnetic or optical signals, which carry digital data streams representing various types of information. Communications through communication interface 218 may permit transmission or receipt of the intrusion detection, suppression and countermeasure agents for taking countermeasures against suspected or actual unauthorized users.

Although the recovery architecture 300 is shown installed on the security server 114, the recovery architecture 300 may be stored on other network devices 101 of the LAN 100, including the computer system 112. As will be described later, in an embodiment, elements of the recovery architecture 300 are stored at some or all of the network devices 101 in the LAN 100.

As noted above, unauthorized users can gain access to information on the LAN 100, such as on the computer system 112 or any of the other network devices 101. Such access can compromise information on the computer system 112, and the other network devices 101, and may require an extensive recovery process if all the compromised information is to be recovered. If the LAN 100 is subjected to an information warfare (IW) attack, then restoration of the LAN 100 to full operational capability may involve shutdown of all, or part, of other systems and components of the LAN 100, followed by restart of these systems. This shutdown and restart may be very time consuming. Intruders may be able to take advantage of the down-time associated with recovery by physically attacking assets associated with the LAN 100. This vulnerability may be avoided by preventing complete shutdown of the LAN 100, and by instituting real-time recovery of essential systems and components of the LAN 100.

To streamline the recovery process, the LAN 100 employs a number of specific architectural features and software routines. Copending application entitled "Real-Time Recovery Of Compromised Information," assigned to the instant assignee, filed on even date herewith, and hereby incorporated by reference, describes specific architectural features and routines to streamline network recovery. Other architectural features and routines usable by the LAN 100 will be described below.

In an embodiment, the recovery architecture 300 (described below with reference to FIGS. 5A-5D) uses a concept of conditions on the LAN 100. In particular, an operational state of each node 101, subnet 103, and the entire LAN 100 is defined in terms of whether or not the node 101, subnet 103, and the LAN 100 is fully operational (state 0), under IW attack, or recently attacked (state 1), or recovering from the IW attack (state 2). FIG. 4 illustrates the concept of conditions. The operational status of each component (i.e., network device 101 and subnet 103) of the LAN 100 can then be indicated by setting an appropriate flag. Such a flag may be set by software resident on the component. For example, the computer system 112 may include software, data, and appropriate processing capacity to determine if the computer system 112 itself is possibly under an IW attack. If the computer system 112 identifies symptoms indicative of an IW attack, the computer system 112 may change an operational status flag from 0 to 1. As will be described later, the security server 114 may include means to read the status flags, and may do so on a periodic basis. Alternatively, the security server 114 may poll all the network devices 101 periodically to report operational status. The network devices 101 may also be programmed to periodically report their status flags to the security server 114.

By way of example, and using the conditions provided in FIG. 4, if DATACON=1, NODECON(24)=1, SUBNETCON (2)=1, and NETCON=0, then data residing at the $24^{th}$ node of the second subnet 103 is suspect. With NETCON=0, the LAN 100 is operational. Such a situation could occur as a result of re-routing around the second subnet 103, or around that portion of the second subnet 103 (e.g., node 24) that is non-operational or under IW attack.

Figure 5A:
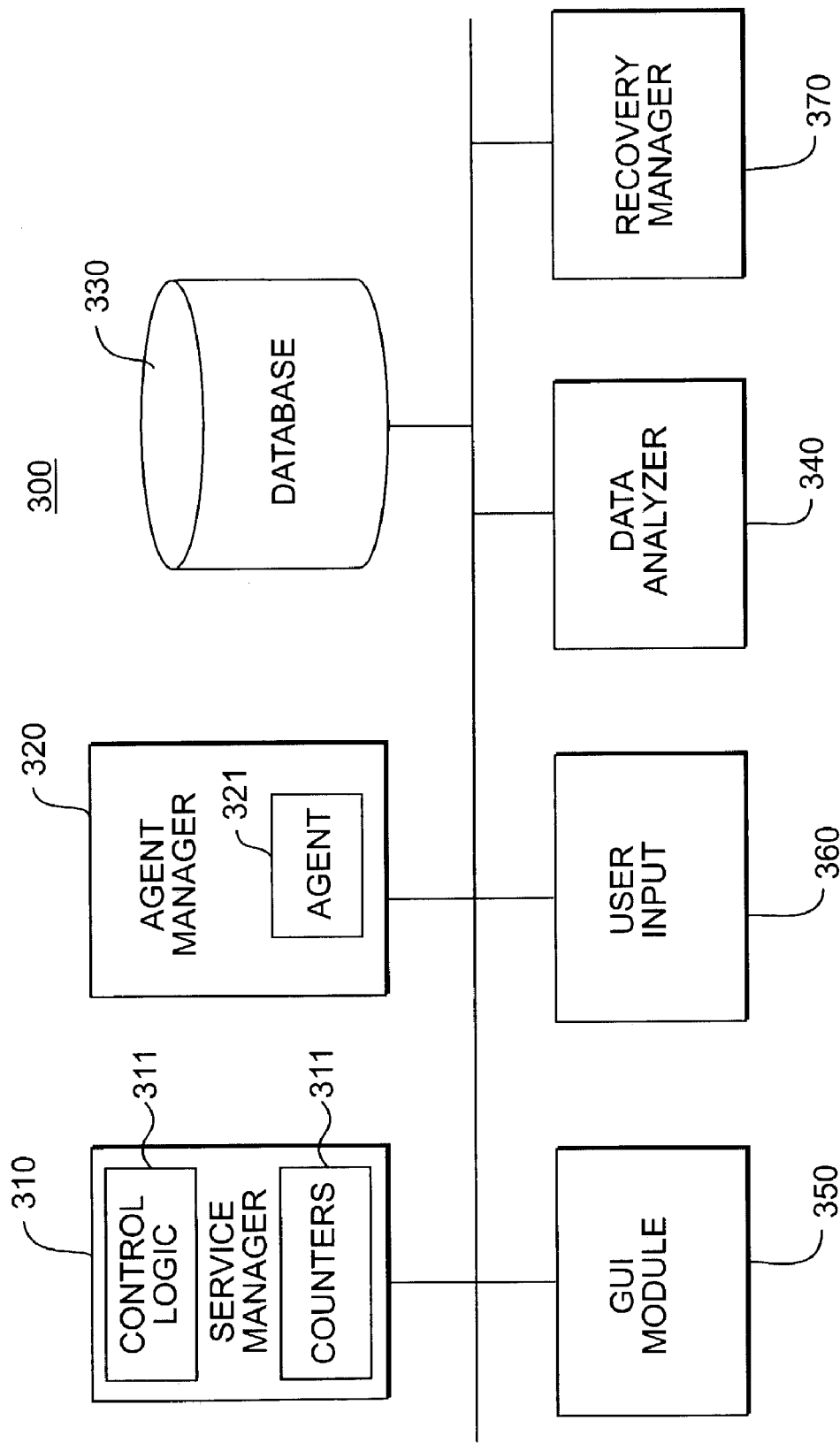
FIG. 5A is a block diagram of a recovery architecture, operable on a device of the network of FIG. 1, for real-time network-based recovery from an information warfare (IW) attack.

FIG. 5A is a block diagram of the recovery architecture 300, operable on a network device 101 of the LAN 100, such as the computer system 112 or the security server 114, for executing the pre-IW attack, IW attack, and post-IW attack phases. The recovery architecture 300 includes a service manager 310, an agent manager 320, a database 330, a data analyzer 340, a graphical user interface (GUI) module 350, a user input manager 360, and a recovery manager 370. The recovery architecture 300 may be embedded in a computer readable medium, such as an optical disk, magnetic memory, or any other storage device capable of being ready by a computer. elements of the architecture may also be implemented in hardware. The recovery architecture 300 may be implemented on the security server 114, and elements of the recovery architecture 300 may be implemented on other devices of the LAN 100, such as the computer 112.

The service manager 310 provides communications between the security server 114 and devices 101 at the nodes of the LAN 100. The service manager 310 may send control and information messages to the network devices 101, and receive information messages from the network devices 101. The service manager 310 may include logic 311 and counters 312 that are used to control the components of the architecture 300, note timing of events in the LAN 100, and process information received from the network devices 101 and the subnets 103.

The agent manager 320 controls a number of agents 321 that operate within a node, or traverse from node to node in the LAN 100. Functionally, the agent 321 is computer software, transportable over a computer network from one computer to another, to implement a desired function on the destination computer. The agent 321 can also be defined as a transferable self-contained set of executable code instructions. From a code perspective, the preferred agents 321 are collections of Java classes combined with a collection of persistent objects. The agents 321 can be also written in many languages such as C++, C and assembler and other languages known to those of skill in the art.

The agent manager 320 uses the agents 321 to collect information from network devices 101. The collected information is processed and may be stored in the database 330 or sent to other components of the recovery architecture 300. The collected information may then be used during the IW attack response and post-IW attack phases to restore the LAN 100 to full operational status. Copending applications entitled "Real Time Recovery of Compromised Information" and "Steady State Computer Intrusion and Misuse Detection," assigned to the instant assignee, filed on even date herewith, and hereby incorporated by reference, disclose methods and systems to recover information needed to expeditiously restore a network to operation following an IW attack. As will be discussed later, some information collected by the agents 321 may be "hidden" by the recovery manager 370 within the LAN 100 to protect the information from possible compromise.

As noted above, the database 330 may store information needed to recovery the LAN 100. The database may include one or more data files, such as graphical images, in which some or all of the recovery information may be "hidden." Other recovery information may be stored in a standard file structure in the database 300.

The data analyzer 340 identifies required recovery information, how the recovery information are accessed, and how the recovery information are used in the LAN 100 for real-time network-based recovery. This recovery information may be further categorized as needed immediately following the IW attack (primary recovery information) and subsequent to immediate recovery operations (secondary recovery information). The required recovery information may change over time as the configuration of the LAN 100 changes. For example, if the LAN 100 were modified to incorporate a radar system for detecting and tracking airborne targets, the data analyzer 340 would identify radar system-related parameters as required recovery information.

The GUI module 350 controls a graphical user interface that is used to display information to a human operator. The user input manager 360 receives user inputs and directs those inputs to the data analyzer 340 for execution. Through the user input manager 360, a human operator can override decisions of the data analyzer 340.

Figure 5B:
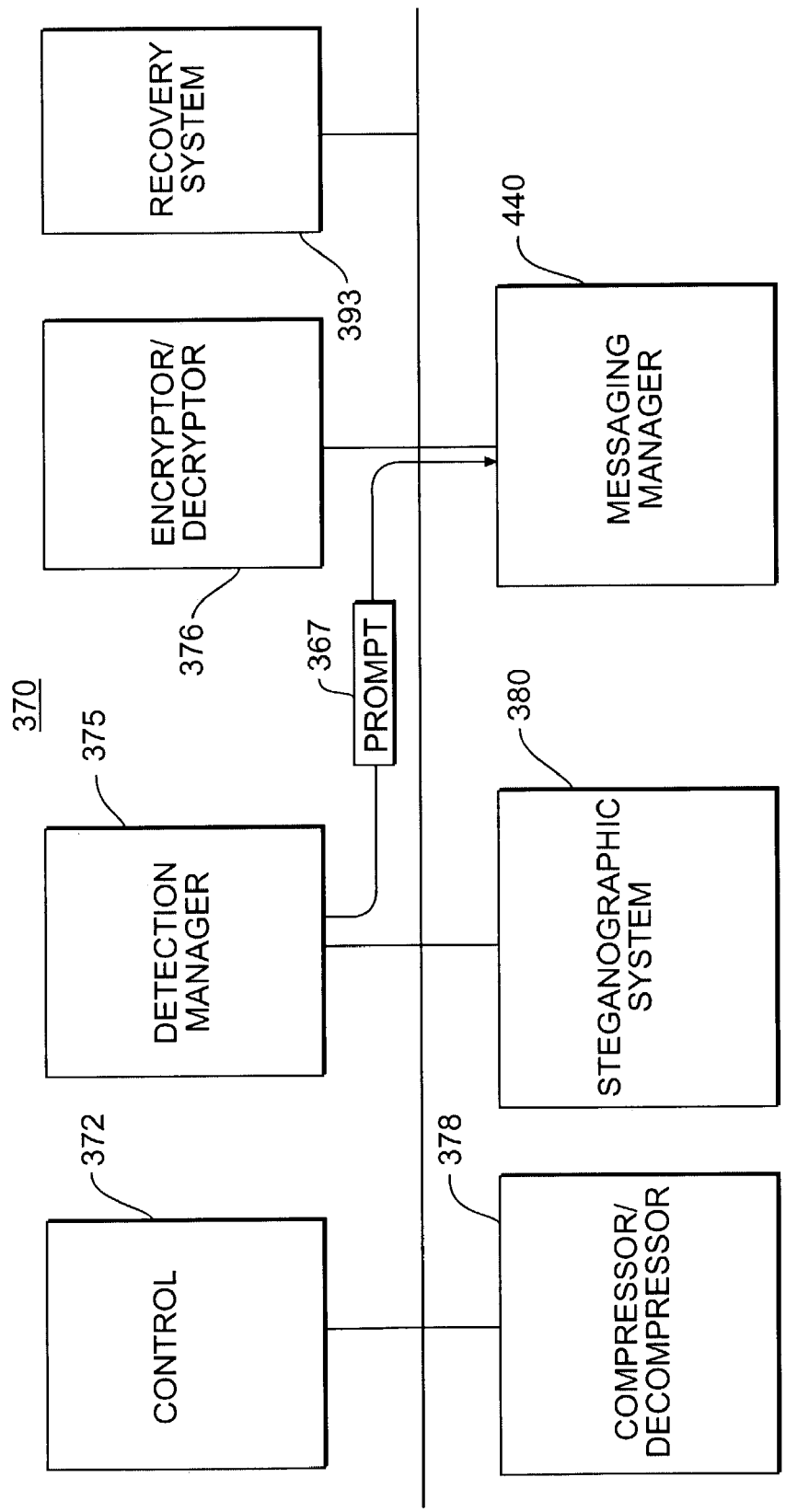
FIG. 5B is a block diagram of a recovery manager operable on a device of the network of FIG. 1.

FIG. 5B is a block diagram of the recovery manager 370. The recovery manager 370 receives recovery information from the recovery architecture 300, and directs execution of appropriate post-IW attack recovery routines. The recovery manager 370 includes a control module 372 that controls processing by components of the recovery manager 370, a detection manager 375 that operates to detect possible intrusion or misuse, an encryptor/decryptor 376 that encrypts and decrypts the recovery information, a compressor/decompressor 378 that compresses and decompresses the encrypted/decrypted recovery information, a steganographic system 380 that "hides" the recovery information, and a recovery system 393 that implements recovery routines in the LAN 100. The steganographic system 380, the recovery system 393, the detection manager 375, and the messaging manager 440 will be described in detail with reference to FIGS. 5C-5E, respectively.

Figure 5C:
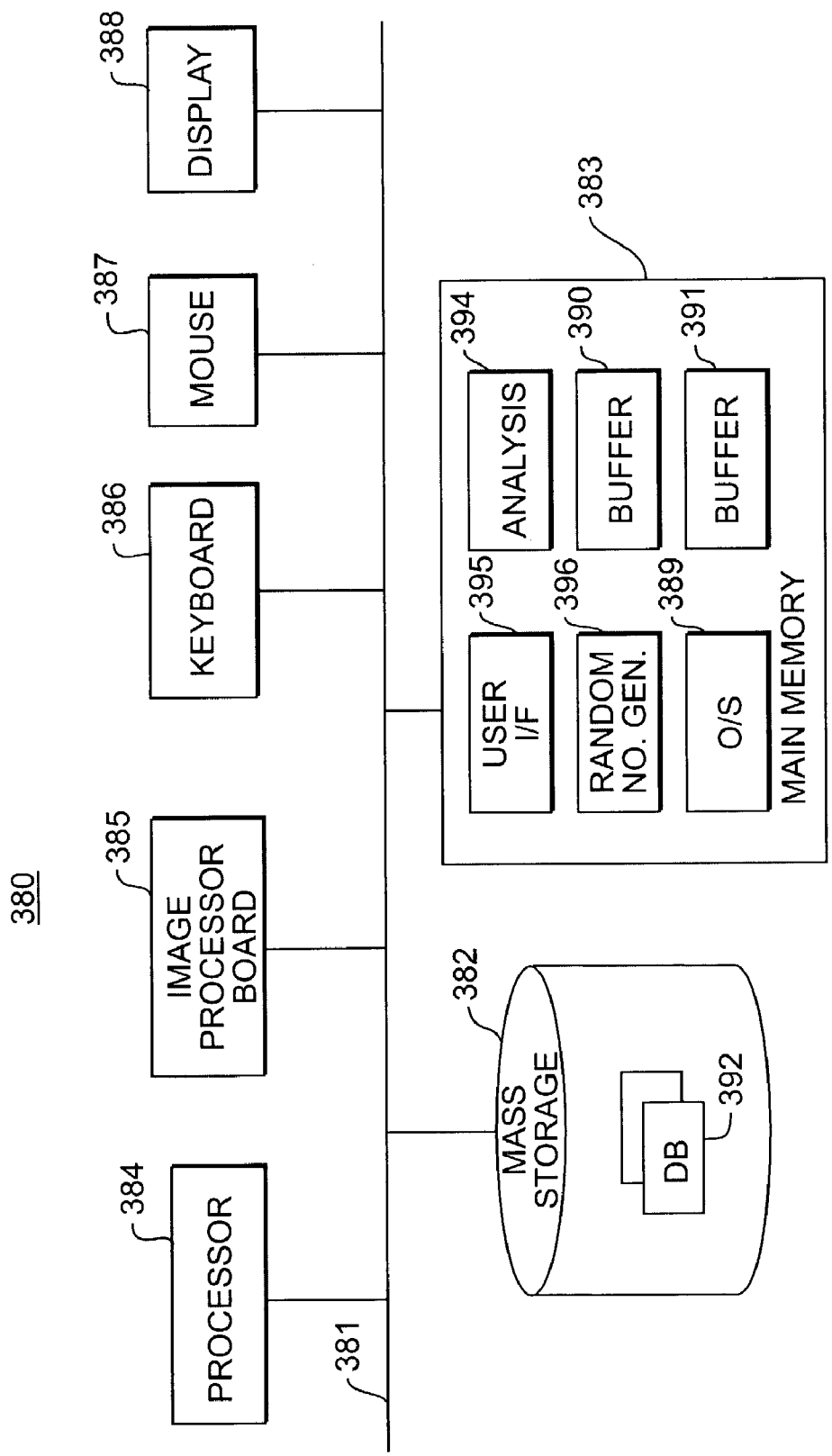
FIG. 5C is a block diagram of a steganographic system used with the recovery manager of FIG. 5B.

FIG. 5C is a block diagram of the steganographic system 380. The steganographic system 380 uses the well-know art of steganography to "hide" the recovery information on components of the LAN 100 so that the recovery information is less susceptible to an IW attack.

Data hiding is a class of processes used to embed recoverable data in digitally represented information, such as a host image, with minimal degradation to the host image. In the context of the LAN 100, the goal of data hiding is to insulate the recovery information from an IW attack on other parts of the LAN 100.

After receiving the recovery information, the encoded image may undergo intentional and inadvertent modification due, for example, to channel noise, filtering, resampling, rotation, cropping, lossy compression, or digital-to-analog (or analog-to-digital) conversion. In order to be effective, the data hiding technique should embed the recovery information in a manner that allows determination of its presence or absence even after such modifications.

In an embodiment, the steganographic system 380 embeds one bit or a pattern of bits indicating the presence or absence of the recovery information, in a host image in a manner that allows its detection by exploiting the behavior of sums of a large number of random variables. Specifically, the data-embedding technique requires altering characteristic parameter values at a set of pseudo-randomly chosen locations in the host image in a manner that markedly changes the expectation value of some linear combination of mathematical functions of the values at that set of locations. The embedded recovery information is recoverable from a test image by calculating an experimental value of a linear combination of a large number of instances of the functions and comparing the experimental value with the expectation value of the sum for the unaltered host image. Many other data hiding techniques are available for embedding the recovery information in another digital data file. Such techniques are well know in the art, examples of which are taught in U.S. Pat. Nos. 6,314,192, 6,301,360, and 6,252,963, the disclosures of which are hereby incorporated by reference.

The embedding is done by first randomly selecting a large number of locations in the host image, for example by associating locations in the image with members of a series of pseudo-random numbers. In the general case, the locations are partitioned into first and second groups. The host image is then altered by increasing the values of the characteristic parameter at locations belonging to the first group and decreasing the values of the same parameter at locations belonging to the second group. For digitally encoded images, the locations correspond to groupings of adjacent pixels.

Decoding entails determining whether or not a test image includes the embedded pattern. To decode, the selection and partition of locations generated during the embedding process is recreated, for example, by supplying a key specific to the pattern to a pseudo-random number generator and then applying the partition procedure. The decoder then calculates an experimental value of a test statistic, formulated to reflect the alterations to the host image associated with the statistic, of the parameter values assessed at the selected locations in the test image. Generally, the test statistic is equivalent to a linear combination of many instances of respective functions of the parameter values of locations belonging to the first and second groups. For example, if the parameter values of the first group locations are all increased and those of the second group all decreased, an appropriate function would be the difference between the sums of the parameter values over the first and second group locations. This calculation does not require the decoder to have the host image.

If the probability density functions of the parameter at all locations have finite expected value and variance and are identical and independent of the values assumed at other locations, then a test statistic equal to the sum of a large number of instances of a linear combination of the parameters assumes a Gaussian form. This property facilitates determining quantitatively whether the observed value of the test statistic indicates operation of the probability density function associated with the unaltered host image or of the shifted density associated with the embedded pattern. A Gaussian description may be appropriate even for statistics that do not conform to the restrictions just listed. Furthermore, even a nonGaussian statistic can adequately differentiate between an unshifted and a shifted probability density function. The likelihood of an observed experimental value's belonging to a density of known expected value can be bounded using the Chebyshev inequality, for example.

The reliance of the decoding on the statistical properties of combinations of many numbers renders the embedded recovery information resistant to defeat by degradation of the image carrying the pattern. The express knowledge of the location selection and partition as well as of the specific alteration to the parameter values that is required to reverse the encoding makes the embedded bit resistant to intentional removal from the altered host image. Applying the changes to pixel groupings protects the embedded bit from obliteration by lossy compression, tone correction, filtering, cropping, and affine transformation.

In FIG. 5C, the steganographic system 380 is shown to include a system bus 381, over which all system components communicate, a mass storage device (such as a hard disk or optical storage unit) 382 and a main system memory 383.

A central-processing unit (CPU) 384 controls operation of the steganographic system 380 and its components. To facilitate rapid execution of the image-processing operations, the steganographic system 380 also contains an image-processor board 385.

In an embodiment, the steganographic system 380 is automated using the CPU 384 to embed the recovery information in a host image at a node of the LAN 100. Alternately, a human operator can interact with the steganographic system 380 using a keyboard 386 and a position-sensing device (e.g., a mouse) 387. The output of either device can be used to designate information or select particular areas of a screen display 388 to direct functions to be performed by the steganographic system 380.

The main memory 383 contains a group of modules that control the operation of CPU 384 and its interaction with other components. An operating system 389 directs the execution of low-level, basic system functions such as memory allocation, file management and operation of mass storage unit 382. At a higher level, an analysis module 394, implemented as a series of stored instructions, directs execution of the primary functions performed by the steganographic system 380. A user interface 395 allows straightforward interaction over the screen display 388. The user interface 395 generates words or graphical images on the screen display 388 to prompt action by the user, and accepts user commands from the keyboard 386 and mouse 387. A random number generator 396 creates the ordered series of pseudo-random numbers used in encoding or decoding.

The main memory 382 also includes one or more input image buffers 390 that contain image(s), such as a host image, and output image buffers 391 that contain an output image generated by processing the host image. The contents of each input or output image buffer define a raster, i.e., a regular two-dimensional pattern of discrete pixel positions that collectively represent an image and may be used to drive (e.g., by means of image-processor board 385) the screen display 388 to display that image. The values of pixel parameters, such as luminance, contained at each memory location in an image buffers 390 or 391 directly governs the appearance of a corresponding pixel on the display 388.

One or more databases 392 contain encoding and/or decoding information, e.g., the output of the random number generator 396, the key used by the random number generator 396 to generate the pseudo-random number series, the role governing assignment of pixels to groups, the description of groups, the test statistic formulation, and the expected value or descriptions of geometric transformation. One or more of the databases 392 may be associated with each one of the image buffers 390 or 391 and may each contain information specific to the image contained in the associated buffer; or, one database 392 may contain information generic to all images encoded or decoded by the apparatus. The databases may be stored in the mass storage device 383 in file(s) linked to file(s) containing the associated image(s).

Figure 5D:
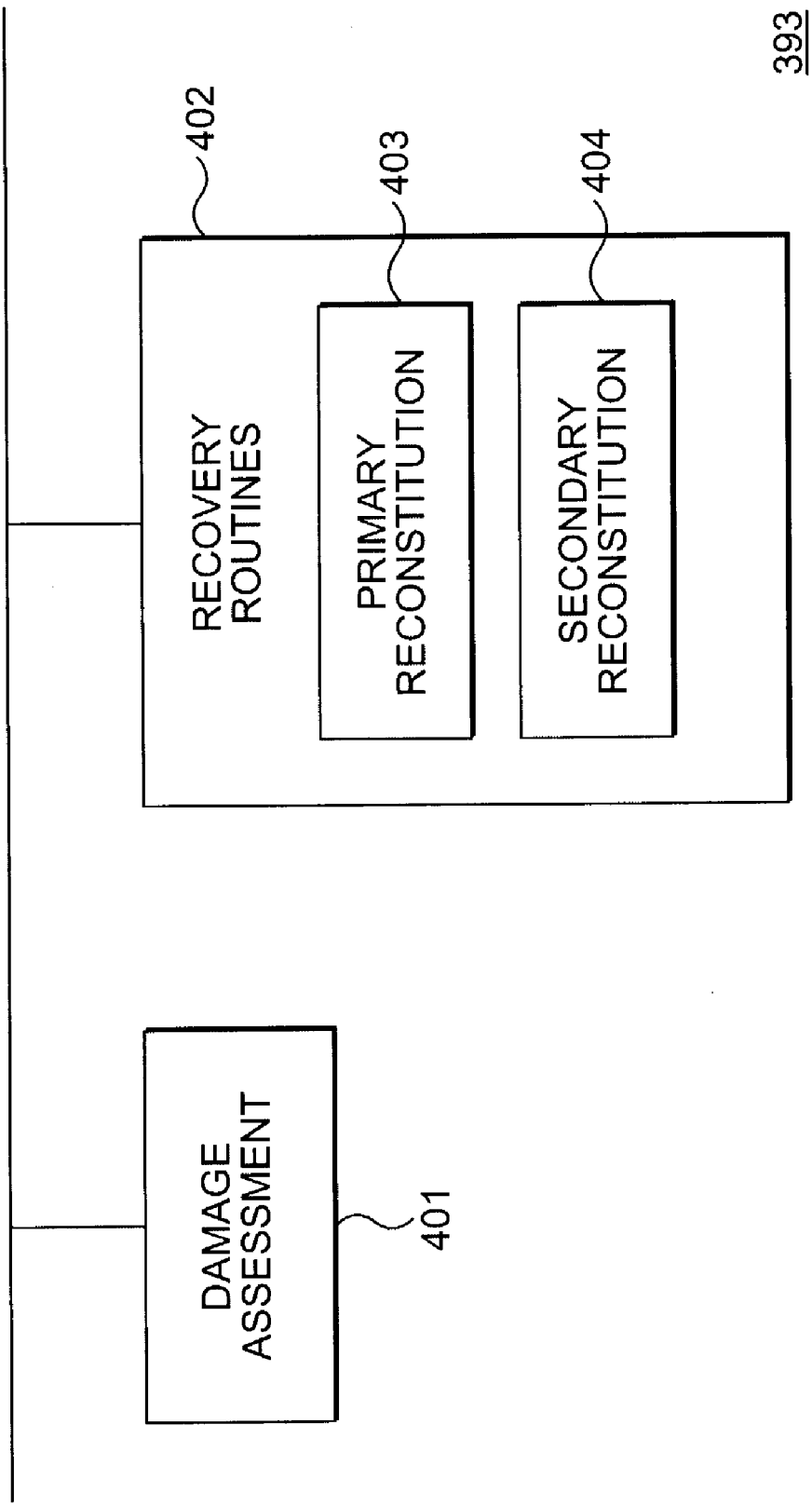
FIG. 5D is a block diagram of a recovery system used with the recovery manager of FIG. 5B.

FIG. 5D is a block diagram of the recovery system 393. The recovery system 393 includes a damage assessment module 401 and recovery routines 402. The recovery routines 402 include primary reconstitution routines 403 and secondary reconstitution routines 404. The recovery system 393 is preferably implemented as software operating on one or more network devices 101 of the LAN 100.

The primary reconstitution routines 403 provide the instructions required to perform a limited, "hot-start," or real-time recovery of the LAN 100 following an IW attack. The secondary reconstitution routines 404 are the instructions needed to restore the LAN 100 to full operation following an IW attack.

The damage assessment module 401 contains software routines to determine the extent of data corruption and other damage that may have occurred to the network devices 101. For example, the damage assessment module 401 may include routines to execute check sum operations on selected data from the nodes and subnets. Data failing to satisfy the check sum requirements may be considered corrupted.

Figure 5E:
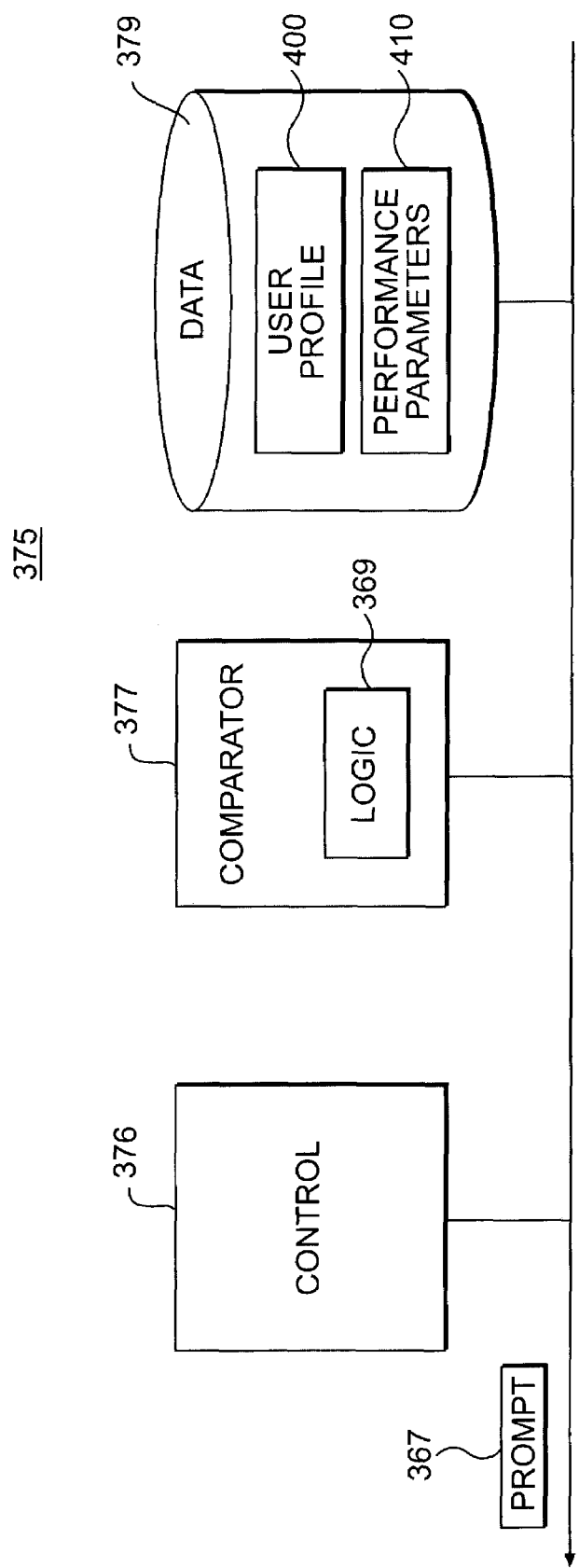
FIG. 5E is a block diagram of a detection manager used with the recovery system of FIG. 5D.

FIG. 5E is a block diagram of the detection manager 375 of FIG. 5B. The detection manager 375 contains software routines, data storage, and processing means to detect an IW attack anywhere on the LAN 100. Copending application, entitled "Steady State Computer Intrusion And Misuse Detection," assigned to the instant assignee, filed on even date herewith, and incorporated herein by reference, describes mechanisms to detect computer misuse and intrusion. Detection may be based on a number of potential activities that are monitored by the detection manager 375. For example, insider misuse can be detected when an authorized user performs an unauthorized, or perhaps, infrequent operation that may raise the suspicion that the authorized user's computer is being misused. An unauthorized user could obtain the password of an authorized user, log on to the LAN 100 from the authorized user's computer, and attempt to perform operations not typically associated with the authorized user. In another example, user profile data may stored in a database and may be used to detect an intrusion. The user may have access to a particular database but has not accessed the database for over a year. A sudden access of the database may be inconsistent with the user profile, and may generate an alert that an intrusion or insider misuse is occurring. In yet another example, the software agents 321 controlled by the agent manager 320 may fail to report back from a particular network device 101, indicating an IW attack is possibly occurring at the network device 101. Still other examples are an attempted login by a computer that does not have access to the LAN 100, multiple failed log on attempts, excess system calls and root logins, and system memory changes. Such "unusual behavior" at a network device 101 may cause elements of the recovery architecture 300 that reside at the network device 101 to changes the status flag of the network device from 0 to 1.

As shown in FIG. 5E, the detection manager 375 includes a control module 376 that controls processing by components of the detection manager 375, a comparator 377 that analyzes data, and a data storage device 379. The detection manager 375 may be implemented solely on the security server 114. Alternatively, parts of the detection manager 375 may also be implemented on one or more of the network devices 101. In an embodiment, each network device 101 in the LAN 100 includes some portion of the detection manager 375 so that each network device 101 is capable of detecting indications of the IW attack.

The comparator 377 may examine data at network devices 101 and compare the data to a predefined condition. If the comparison indicates a possible IW attack, the detection manager 375 may provide an alert or other means of notifying the security server 114 of the condition. In an embodiment, the detection manager 375, implemented locally at a network device 101, may set a condition flag at 1 to indicate an IW attack is occurring or has just occurred (see FIG. 4).

Examples of data that the local detection manager 375 may analyze are computer performance parameters that indicate an operational profile of the network device 101. For example, the software agents 321 may collect computer performance parameters 410, and the comparator 377 within the local detection manager 375 then compares the collected parameters 410 to an established user profile 400 that reflects normal operation of the network device 101. If the comparison indicates an unusual behavior pattern, the detection manager 375 may generate an alert (e.g., set the condition flag to 1). The measured performance parameters may exceed the user profile 400, a trend of the performance parameters 410 may indicate that a limit will soon be exceeded, or a combination of specific performance parameters 410 measured within limits, but increasing, may indicate a potential IW attack. The comparator 377 includes logic 369 to analyze the relationship between the measured computer performance parameters 410 to determine if the measured values indicate a specific type of problem. In an example, a comparison of the parameters 410 to the user profile 400 may indicate excessive disk accesses with many read/write operations. If a high number of erasures is also detected, such a situation may indicate purging of a computer memory. Such purging may in turn indicate computer misuse or intrusion, and can be used to signify to the security server 114 that action should be taken. Once such a determination is made, the detection manager 375 then may suggest taking a specific action by providing a prompt 367 to a messaging manager 440 (see FIG. 5F). The prompt 367 may indicate the nature of the situation and a suggested action to minimize harm to the LAN 100.

When implemented in the security server 114, the comparator 377 compares the computer performance parameters 410 to a network version of the user profile 400. In addition, when implemented on the security server 114, the comparator 377 compares a local version of the user profile 400 to the network version of the user profile. A divergence between the network version and the local version of the user profile 400 may indicate tampering with the network device in an attempt to mask an IW attack.

Figure 5F:
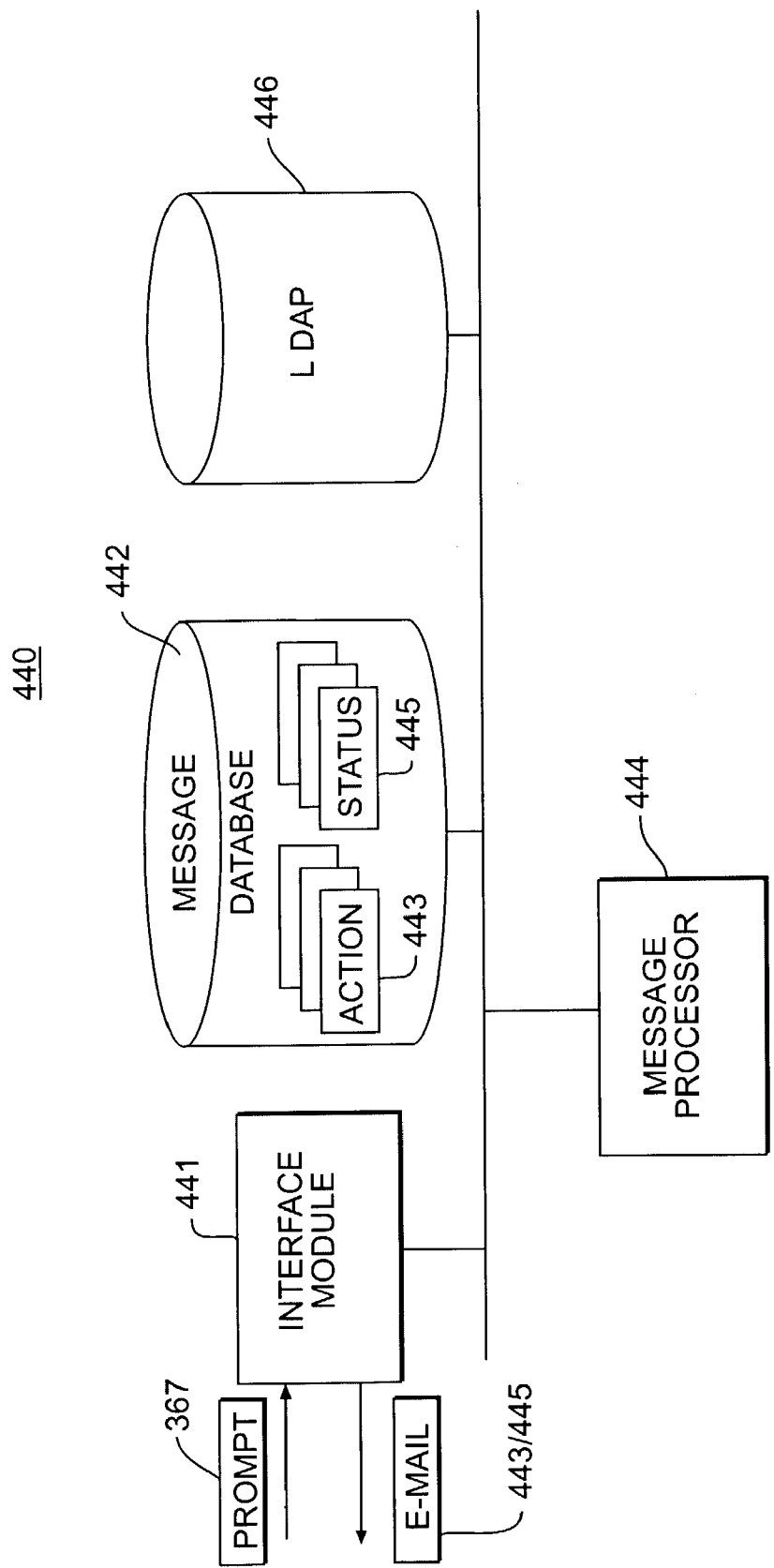
FIG. 5F is a block diagram of a messaging manager used with the recovery manager of FIG. 5B.

FIG. 5F is a block diagram of the messaging manager 440. The messaging manager 440 receives inputs from the detection manager 375, and formulates and forwards status and action messages to other components and nodes in the LAN 100. The messaging manager 440 includes an interface module 441, a message database 442, a message processor 444, and a Lightweight Directory Access Protocol (LDAP) database 446. The interface module 441 receives prompts 367 from the comparator 377. The prompts 367 are cross-referenced to a series of action messages 443 and status messages 445 that are stored in the message database 442. The prompt 367 may indicate that a status message 445 should be sent to a security administrator (i.e., a human operator) in the LAN 100. The message processor 444 reviews the prompt 367 and selects the appropriate status message 445 from the message database 442. The message processor 444 then consults the LDAP database 446 to verify the correct e-mail address (or other means of contact) of the security administrator, and inserts the security administrator's e-mail address in the message header. The interface module 441 then sends the status message 445 to the security administrator. In the event of an IW attack, the prompt 367 may suggest a specific action be taken, such as disconnect the user's computer from the LAN 100, for example. The associated action message 443 may automatically direct the execution of this action, and may simultaneously notify the LAN 100 security administrator of the action taken. In an embodiment, the action message 443 may be pending in the LAN 100 until a specific direction from the security administrator is received by the message processor 444 to proceed with the suggested action. For example, the security administrator may be required to send an e-mail response back to the message processor 444 before the user's computer is isolated.

Messaging in the LAN 100 follows a cause and effect pattern. That is, some messages from the network devices 101 will generate responsive messages from other network devices, creating a related message stream. The content of subsequent messages in the related message stream may depend on the content of prior messages in the stream. An IW attack on the LAN 100 has the potential to leave gaps in the related message stream. The IW attack may also prevent issuance of subsequent messages that are needed for proper operation of the LAN 100 (i.e., the related message stream stalls). The messaging manager 440 tracks related messaging in the LAN 100. Using time marks established by the service manager 310 and the detection manager 375, the messaging manager 440 can identify related message streams that may be interrupted or stopped by the IW attack. Then, by accessing the network devices responsible for the messages in the message stream, the messaging manager can identify actions necessary to fill in the gaps in the message stream (if possible) and to restart stalled related message streams.

To determine the status of related message streams, the messaging manager 440 receives an indication of an IW attack, along with a time mark of the attack, and the affected nodes and subnets. The messaging manager 440 determines the existence of related message streams involving the affected nodes, and identifies if any related message streams contain gaps or are stalled. The messaging manager 440 may employ a variety of techniques to identify gaps and stalled messages streams. For example, messages among network devices 101 may carry an identification number and a sequence number so that all messages in the messages stream may be located and placed in order. If such a message stream has any gaps the messaging manager 440 can determine the source of the of the missing message(s). The messaging manager 440 can then attempt to retrieve the missing message(s), or can indicate to subsequent nodes in the message stream that certain messages are missing. If a related message stream is stalled, the messaging manager 440 may direct the node where the stall occurs to reinitiate the related message stream (e.g., resend the last message in the related message stream). In another embodiment, the messaging manager 440 may direct that all messaging in the LAN 100 be saved for s specified period (e.g., for the last hour). Then, if any related message streams stall or experience gaps, the messaging manager 440 can retrieve the saved portions of the related message stream, and resend some or all of the messages from the related message stream. Many other techniques are available to identify and reinitiate stalled message streams, and to identify and correct gaps in related message streams.

One of ordinary skill in the art will understand that although the modules of the recovery architecture 300 have been described separately, this is for clarity of presentation only. In particular, functions of individual modules may be combined into one module, and the modules may be distributed in a variety of ways throughout the LAN 100. Furthermore, some function carried out by the modules of the architecture 300 may be implemented in hardware. As long as the recovery architecture 300 performs all necessary functions, it is immaterial how the modules are structured and distributed within the LAN 100.

Figure 6:
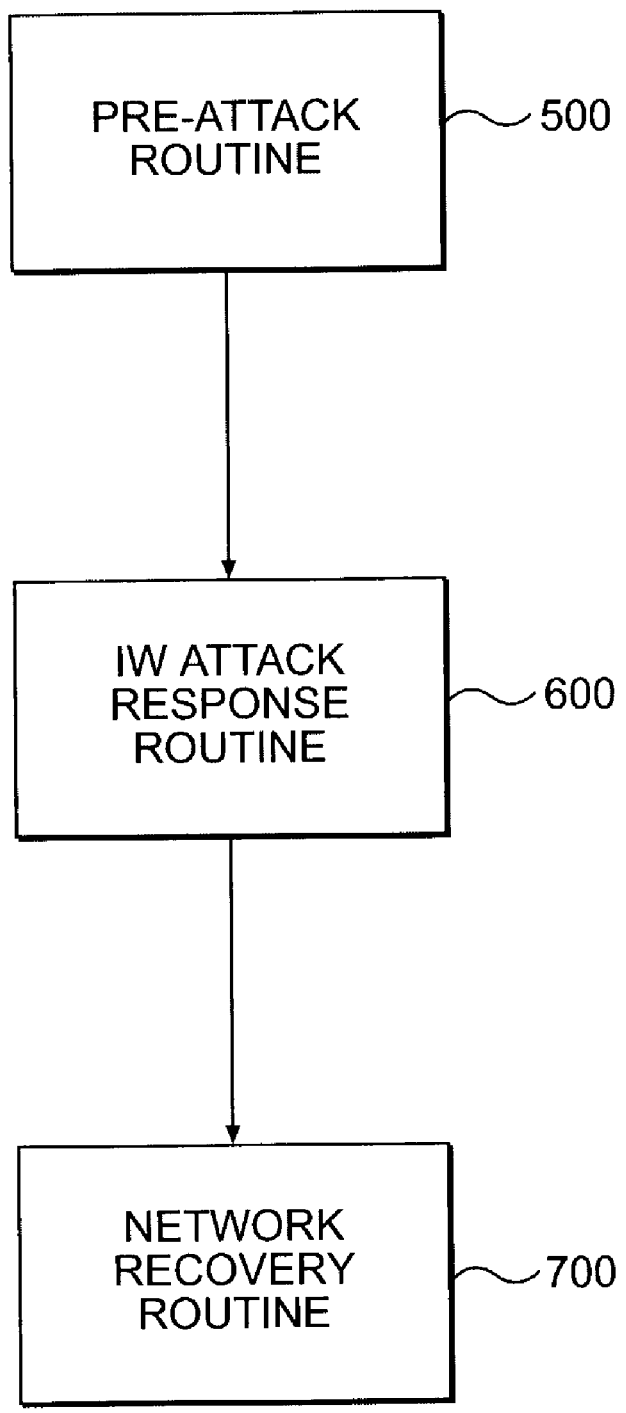
FIG. 6 is an overall flowchart of processes, executable on the devices of the network of FIG. 1, for real-time network-based recovery.

FIG. 6 is a flowchart showing the major routines 399 used in preparing for, responding to, and recovering from an IW attack. The process steps begin with Pre-IW Attack routine 500, in which the recovery architecture 300 determines what information is needed for real-time network-based recovery. Once the recovery information is identified, the LAN 100 can begin operations to prepare for and to recover from an IW attack. In Attack Response routine 600, the recovery architecture 300 implements sub-routines to assess damage from the IW attack, take corrective actions, including implementing countermeasures, and select appropriate recovery routines. In Post-IW Attack Network Recovery routine 700, the recovery architecture 300 implements routines to recover from the IW attack, including retrieving the recovery information, restoring information to damaged areas of the LAN 100, and invoking secondary reconstitution routines to restore the LAN 100 to full operational status.

FIG. 7 is a flowchart illustrating the Pre-IW Attack routine 500. The routine 500 may be performed "off-line," and determines the recovery data, how the recovery data are accessed, and how the recovery data are used in the LAN 100 for real-time network recovery. The routine 500 is automated using a network device 101, such as the security server 114, and the recovery architecture 300 to provide the requisite analysis.

The routine 500 begins in block 501, and in block 510 the service manager 310 determines what recovery information is potentially available on the LAN 100. Next, the data analyzer 340 identifies what potentially available recovery information is required to recover the LAN 100, and its components, in real-time following an IW attack (block 520). This recovery information may be further categorized as needed immediately following the IW attack (primary recovery information) and subsequent to immediate recovery operations (secondary recovery information). Then, the service manager 310 determines a frequency for collecting the identified recovery information (block 530). In block 540, the agent manager 320 disperses software agents 321 to collect the identified recovery information. The routine 500 then moves to block 550, and the collected recovery information is processed through the recovery manager 370, and, using steganography, or related processes, is "hidden" in data in the LAN 100. In attack detection routine (block 560), the detection manager 375 determines if an IW attack has occurred at any point in the LAN 100. Such an attack can be signified by setting of a condition flag at 1 to indicate an attack status. If an IW attack is in progress, the routine 500 moves to IW Attack Response routine 600. Otherwise, the routine 500 returns to block 540, and collection of the identified recovery information proceeds at the frequency established by the service manager 310.

Figure 7A:
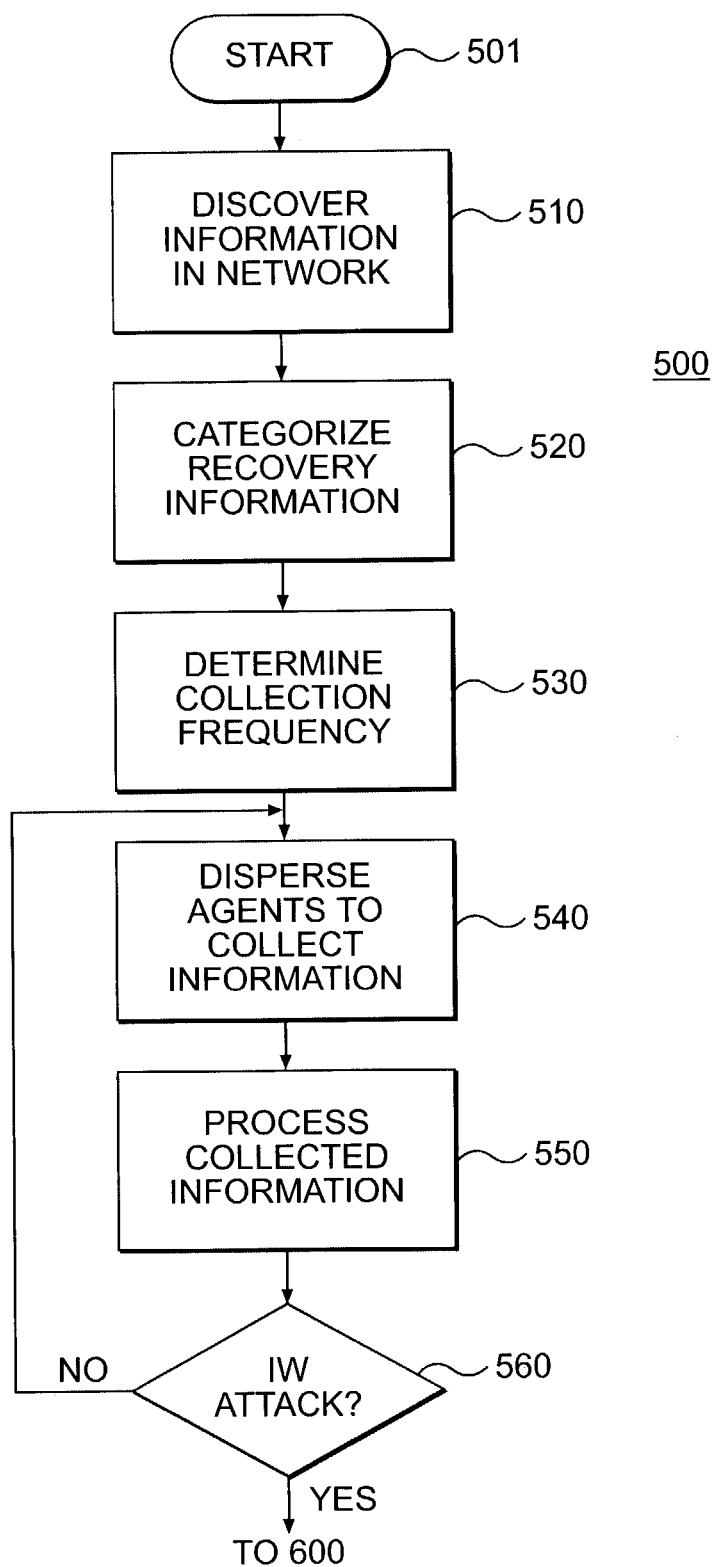
FIGS. 7A and 7B are flowcharts illustrating pre-IW attack routines executable on devices of the network of FIG. 1, for real-time network-based recovery.
Figure 7B:
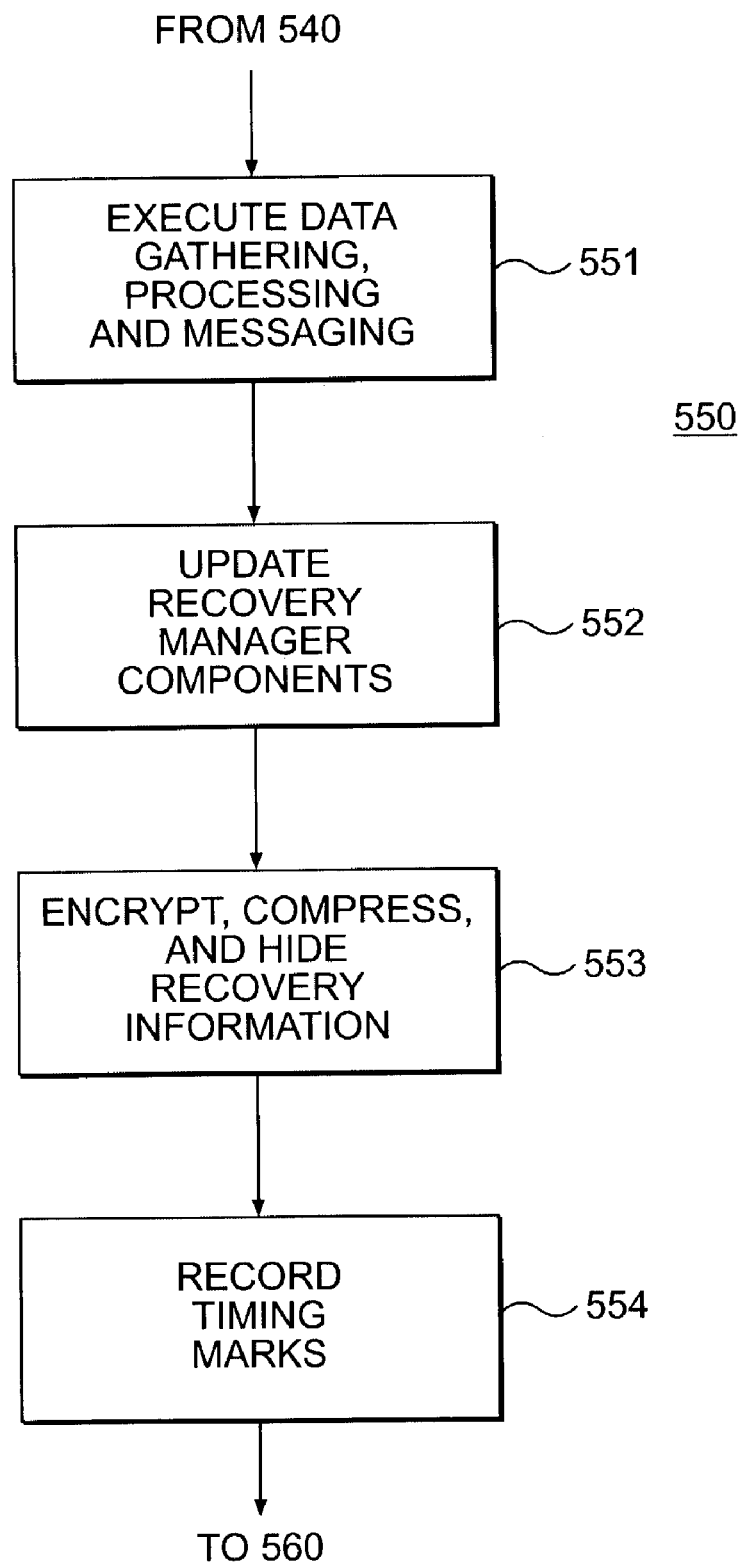

FIG. 7B is a flowchart illustrating the routine 550 for pre-IW attack information processing. In block 551 the recovery manager 370 executes processes at pre-determined intervals to maintain optimal data gathering, computations and messaging. In an embodiment, the recovery manager 370, operating at the security server 114, receives recovery information collected by the software agent 320. In block 552, the recovery manager 370 selects recovery parameters from the collected information and updates components of the recovery manager 370. In block 553, the encryptor/decryptor 376 encrypts the collected recovery information designated by the data analyzer 340. The compressor/decompressor 378 then compresses the minimal essential information. The encrypted, compressed minimal essential information is the processed through the steganography system 380, and is hidden in host files (e.g., host images such as graphical images displayed on a computer screen) on the LAN 100. Next, in block 554, the service manager 310 records time marks for specific events, including the time of last update of time-dependent recovery information; time of last recovery from an IW attack; and time of last storage of recovery information. The routine 550 then ends.

Figure 7C:
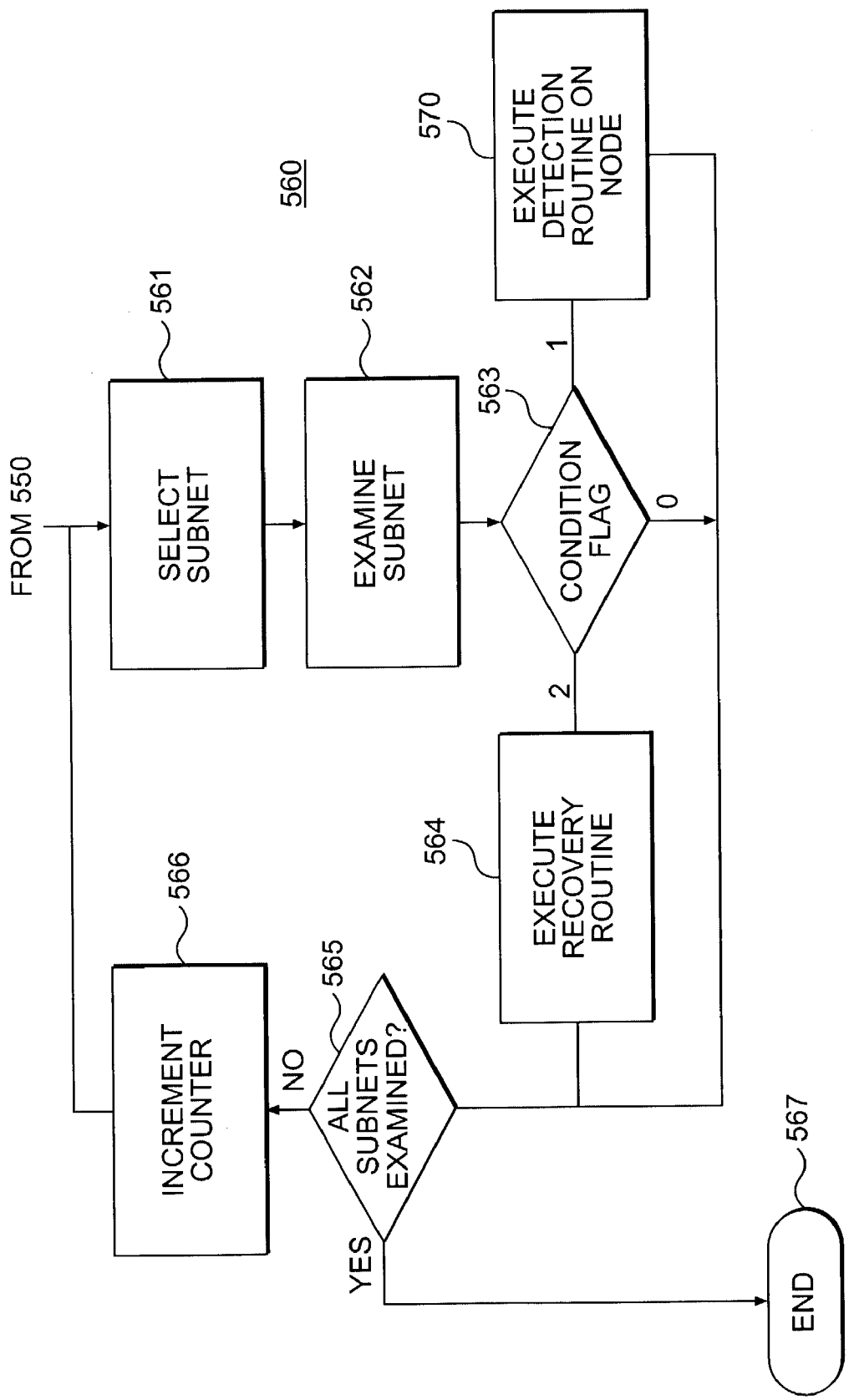
FIGS. 7C and 7D are flowcharts illustrating attack detection routines.

FIG. 7C is a flowchart illustrating the attack detection routine 560 executed on a subnet level. In an embodiment of the routine 560, software agents 321 periodically read condition flags at each of the nodes and subnets in the LAN 100. A condition flag of 1 indicates that the associated node or subnet may be experiencing an IW attack. A condition flag of 0 indicates no IW attack at the node or subnet. A condition flag of 2 indicates the node or subnet is recovering from the IW attack.

In block 561, the agent manager 320 selects the first subnet 103 to examine. In block 562, a software agent 321 notes the state of the subnet condition flag and returns the state to the detection manager 375. the software agent 321 also informs the service manager 310 and the agent manager 320 that subnet condition flag has been read. In block 563, the detection manager 375 reads the state of the subnet condition flag.

If the subnet condition flag reads 1 (indicting an IW attack), the routine 560 moves to block 570, and individual nodes within the subnet 103 are examined. If the subnet condition flag reads 2, the routine 560 moves to block 564, and recovery from the IW attack continues at the subnet 103. The routine 560 then moves to block 565. In block 563, if the subnet condition flag reads 0, the routine 560 moves to block 565. In block 565, the service manager 310 determines if all subnets 103 have been examined. If all the subnets 103 have not been examined, the routine 560 moves to block 566, and a subnet counter 312 is incremented. The routine 560 then returns to block 561, and the next subnet 103 is examined. Otherwise, the routine 560 ends, block 567.

Figure 7D:
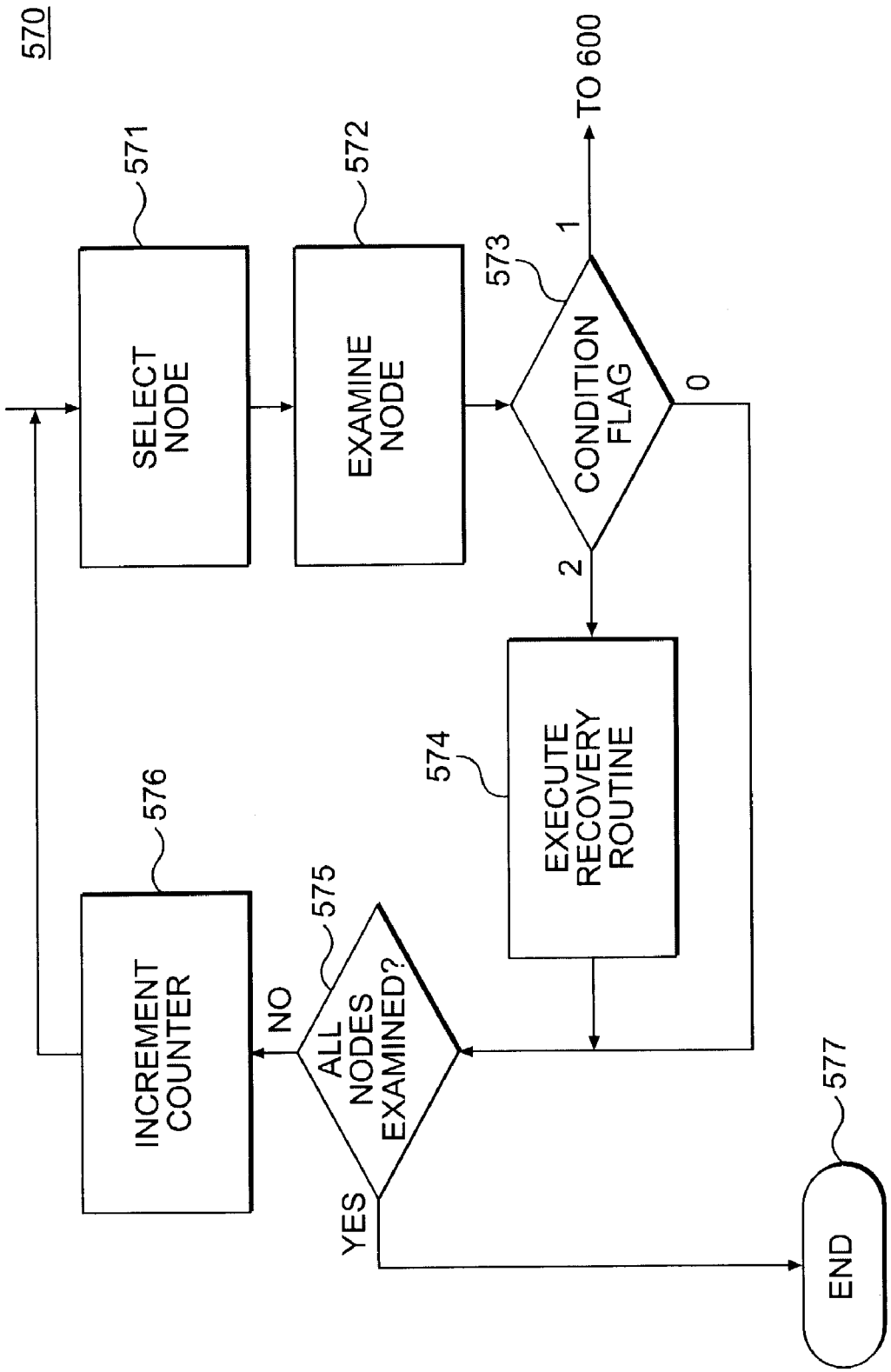

FIG. 7D is a flowchart illustrating IW attack detection routine 570 executed on the nodes of a subnet 103. In block 571, the first node in the subnet 103 is selected. The software agent 321 notes the state of the node condition flag and returns the state to the detection manager 375, block 572, and informs the service manager 310 and the agent manager 320 that the node condition flag has been read. In block 573, the detection manager 375 reads the state of the node condition flag. If the node condition flag reads 1 (indicating an IW attack), the routine 570 moves to block 600, and the IW attack response routine 600 is executed. If the node condition flag reads 2, the routine 570 moves to block 574, and recovery from the IW attack continues at the node. The routine 570 then moves to block 575. In block 573, if the node condition flag reads 0, the routine 570 moves to block 575. In block 575, the service manager 310 determines if all nodes in the subnet 103 have been examined. If all the nodes have not been examined, the routine 570 moves to block 576, and a node counter 312 is incremented. The routine 570 then returns to block 571, and the next node is examined. Otherwise, the routine 570 ends, block 577.

Figure 8A:
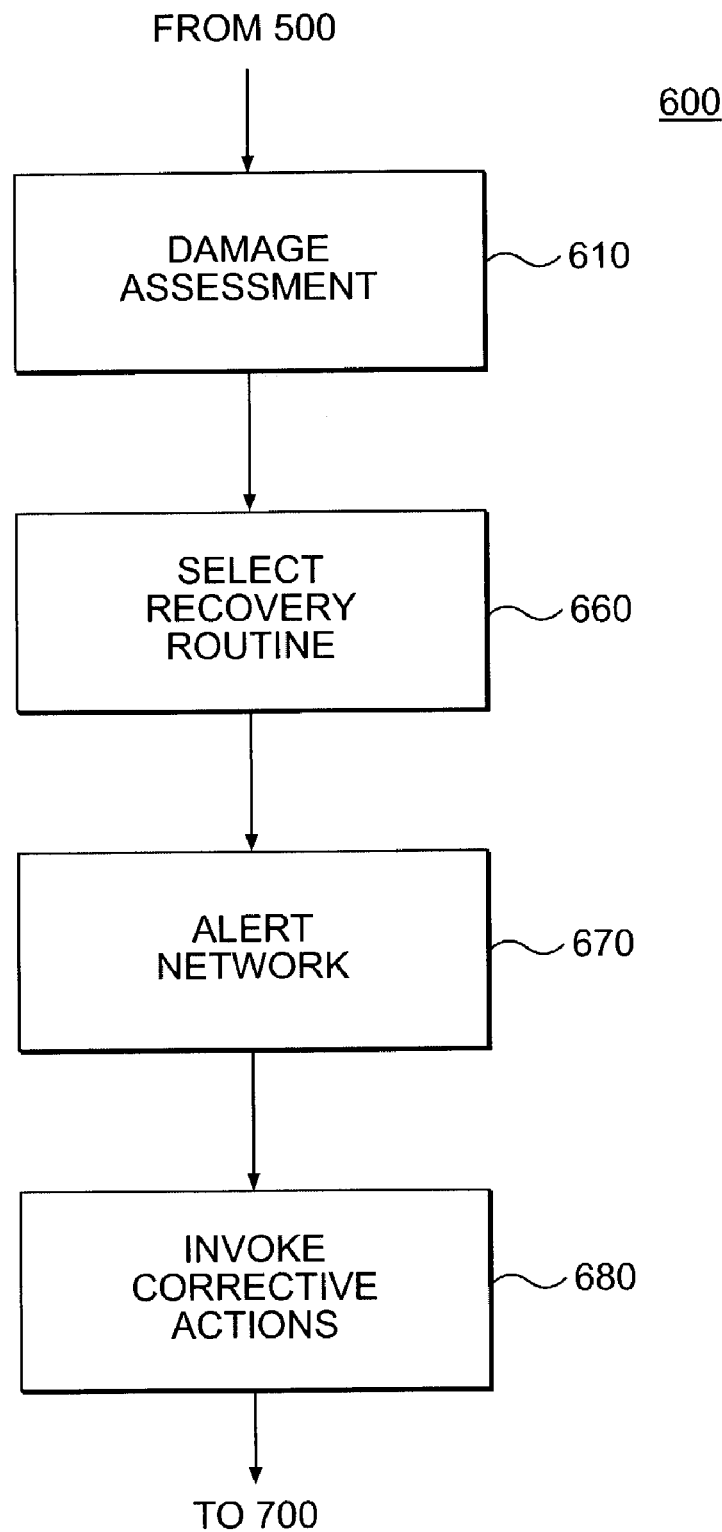
FIGS. 8A-8D are flowcharts illustrating routines for real-time network-based response to an IW attack.

FIGS. 8A-8D are flowcharts illustrating processes, executable on a network device 101 the LAN 100 of FIG. 1, for automatic, real-time network-based recovery from an IW attack. FIG. 8A shows the overall IW attack response routine 600. The response routine 600 is entered from routine pre-IW attack routine 500. In block 610, the damage assessment module 401 determines the nature of the IW attack and determines what portions of the LAN 100 are potentially affected. In block 660, the recovery manager 370 selects appropriate recovery routines based on the damage assessment. In block 670, the recovery manager 370 alerts appropriate portions of the LAN 100 of the IW attack and how the IW attack manifested itself. In block 680, the recovery manager 370 invokes, where possible, actions to automatically correct the damage caused by the IW attack. The response routine 600 then moves to post-IW attack network recovery routine 700.

Figure 8B:
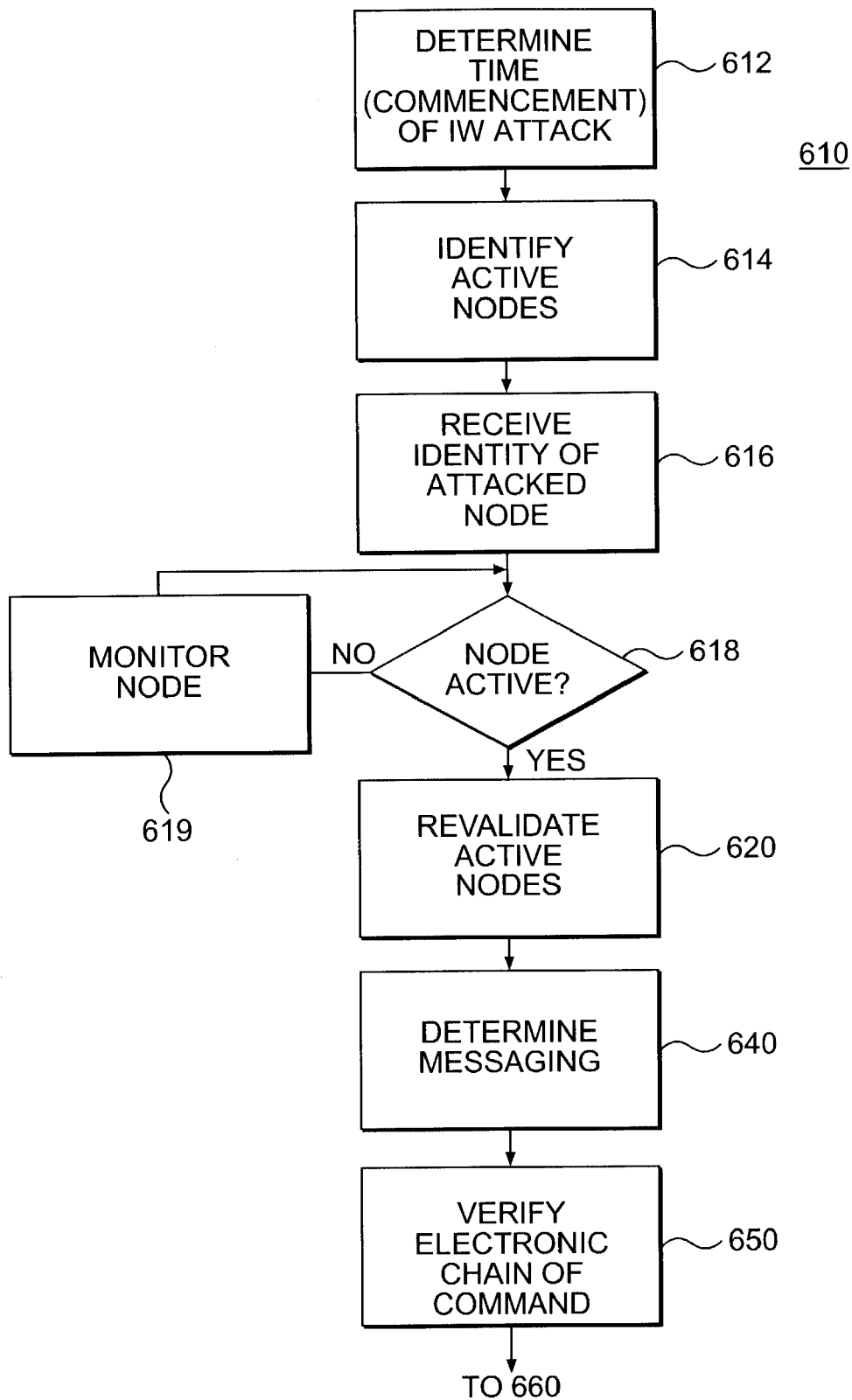

FIG. 8B is a flowchart illustrating the damage assessment routine 610. In block 612, the time (commencement) of the IW attack is determined. In block 614, the service manager 310 identifies all nodes that were active (e.g., logged into the LAN 100) at the commencement of the IW attack. In block 616, the service manager 310 receives the indication of which nodes were possibly attacked (based on the condition flags). In block 618, the service manager 310 determines if a node being attacked at commencement of the IW attack is still active. In block 620, the service manager 310 revalidates all nodes and subnets 103 that were active on the LAN at commencement of the IW attack and that are still active. In block 618, if a formerly active node is no longer active, the service manager 310 monitors the node until the node reactivates.

In block 640, the recovery manager 370 determines which messages may have been sent between nodes after commencement of the IW attack, and reestablishes the messaging. In block 650, the recovery manager 370 verifies the electronic chain of command in the LAN 100, and identifies any deficiencies. To verify the electronic chain of command, the recovery manager 370 may initiate steps to ensure that all nodes in a subnet are capable of accessing other network devices 101, including network devices 101 in other subnets 103, as authorized, and that the nodes cannot access unauthorized network devices 101.

Figure 8C:
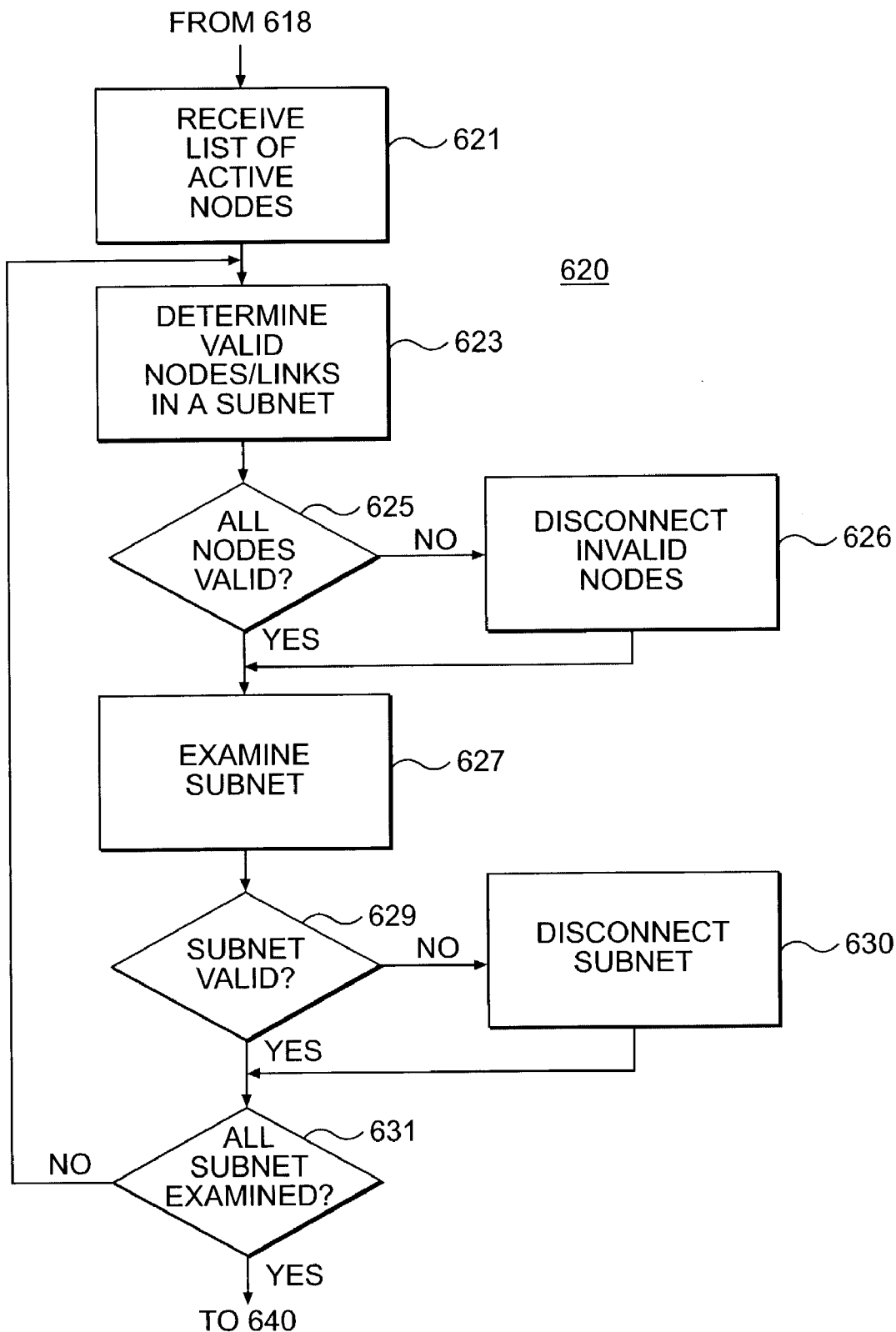

FIG. 8C is a flowchart illustrating the routine 620 for validating the nodes and subnets in the LAN 100 subsequent to an IW attack. In block 621, the recovery manager 370 receives a list of all nodes and subnets 103 that were active on the LAN 100 at commencement of the IW attack and that are still active. In block 623, the recovery manager 370 examines, for each subnet 103, each active node, and the link 102 connecting the node to the LAN 100, and determines which nodes, if any, are not valid. For example, the recovery manager 370 may send a command to each active node to re-enter the node's password or other authorization code. Any node failing to properly enter the password, or failing to respond to the command, would be considered invalid. In block 625, the recovery manager 370 determines if all the nodes in the subnet 103 are valid. In block 626, the recovery manager 370 disconnects any nodes considered invalid, and prevents further logon from these nodes pending completion of specific corrective actions and authorization from the LAN 100 security administrator. The recovery manager 370 then examines, block 627, the subnet 103 and determines if the subnet 103 may remain connected to the LAN 100. If a specified number of nodes in the subnet 103 are invalid, or if other data corruption is indicated with respect to the subnet 103, the subnet itself may be disconnected from the LAN 100 pending completion of specified corrective action and authorization from the security administrator. In block 629, the recovery manager 370 determines if the subnet is valid. If the subnet 103 is not valid, the recovery manger 370 disconnects the subnet 103 from the LAN (block 630). The routine 620 then moves to block 631 and the service manager 310 determines if all subnets 103 have been examined. If all subnets 103 have been examined, the routine 620 moves to block 640. Otherwise, the routine 620 returns to block 623, and the next subnet 103 is examined.

Figure 8D:
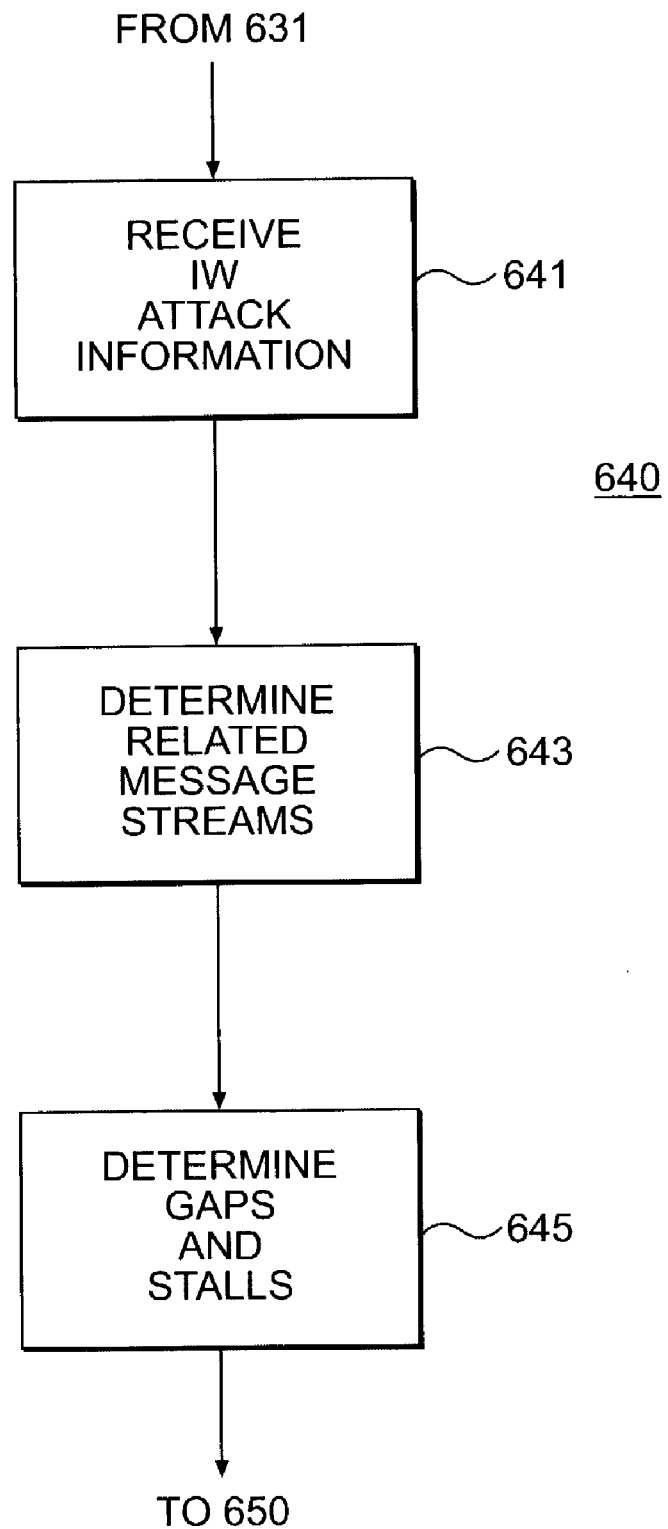

FIG. 8D is a flowchart of the routine 640 for determining message interruption. Following an IW attack messaging in the LAN 100 may experience gaps, or may stall. The messaging manager 440 tracks related messaging in the LAN 100. Using time marks established by the service manager 310 and the detection manager 375, the messaging manager 440 can identify related message streams that may be interrupted or stopped by the IW attack. Then, by accessing the network devices responsible for the messages in the message stream, the messaging manager 440 can identify actions necessary to fill in the gaps in the message stream (if possible) and to restart stalled related message streams.

In block 641, the messaging manager 440 receives an indication of an IW attack, along with a time mark of the attack, and the affected nodes and subnets. The messaging manager 440 determines the existence of related message streams involving the affected nodes, block 643. In block 645, the messaging manager 440 determines if any related message streams contain gaps or are stalled. The routine 640 then ends.

Figure 9A:
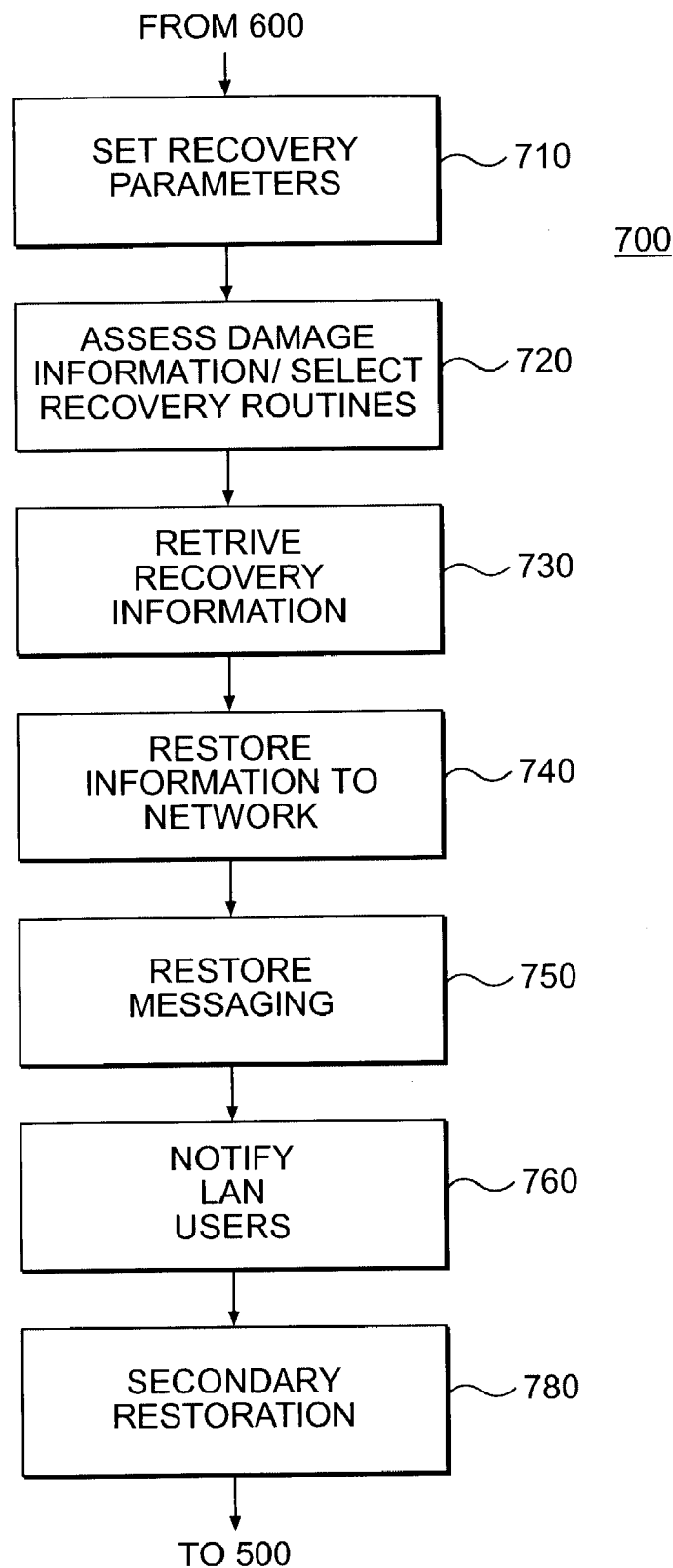
FIGS. 9A-9C illustrate post IW attack network recovery routines.
Figure 9B:
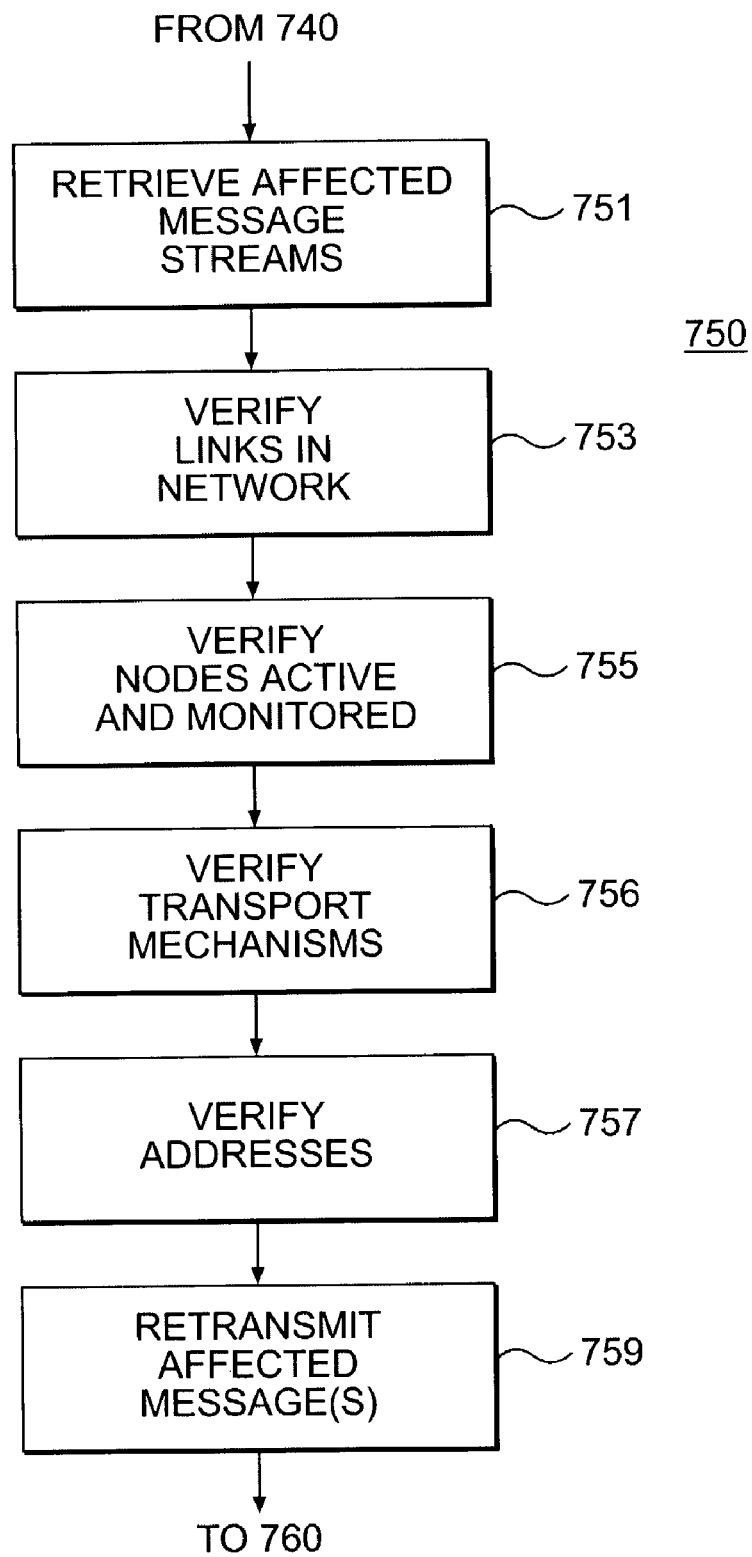
Figure 9C:
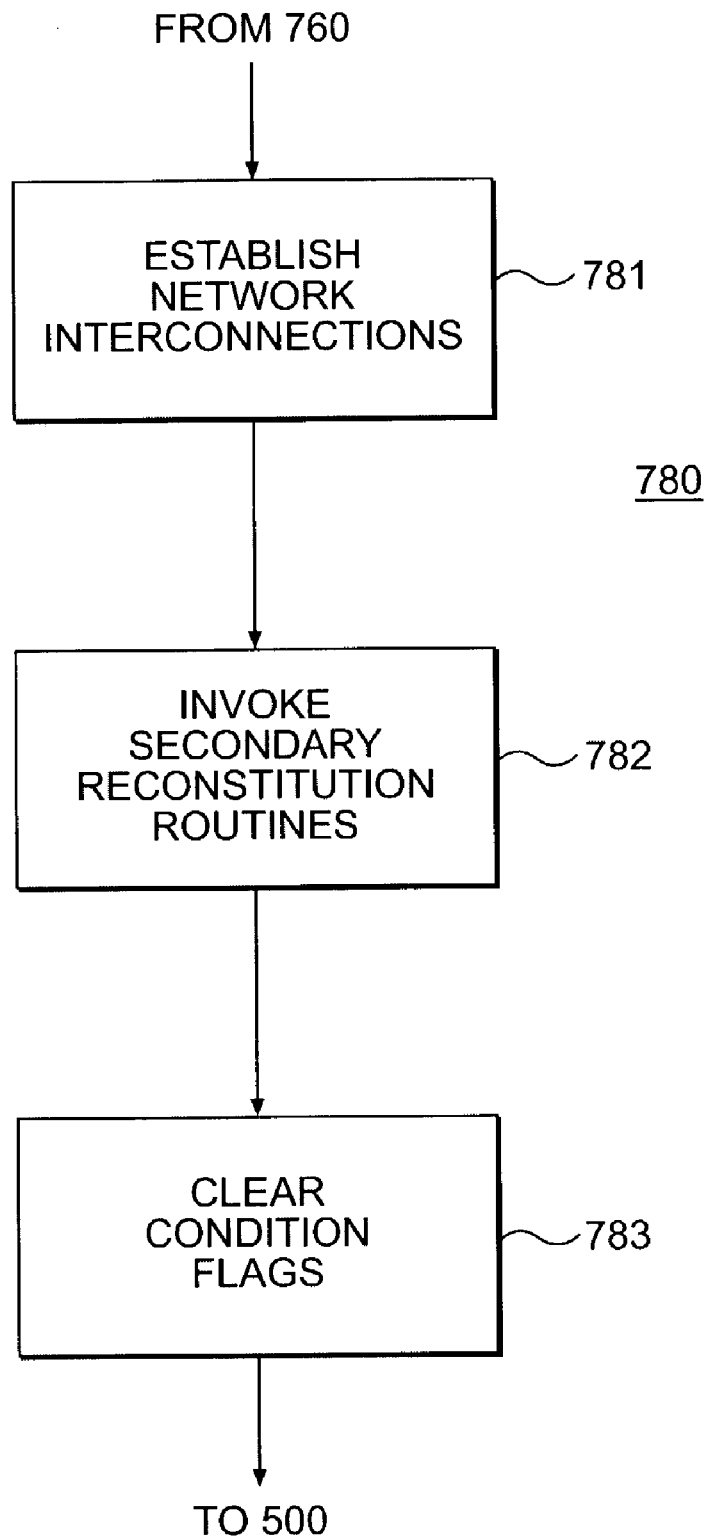

FIGS. 9A-9C are flowcharts illustrating routines, executable on a network device 101 the LAN 100 of FIG. 1, for automatic, real-time network-based recovery following an IW attack. FIG. 9A is a flowchart illustrating a recovery routine 700 for post-IW attack primary restoration of the LAN 100. The recovery routine 700 begins after a determination that the LAN 100, or network device 101, is being subjected to an IW attack (block 560 of FIG. 7A). In block 710, the recovery manager 370 sets necessary system parameters to initiate a real-time network-based recovery mode, which will eventually return the LAN 100 to normal operation. Next, in block 720, the recovery manager 370 accesses real-time damage assessment information that defines the extent of damage to the LAN 100, and selects appropriate recovery routines 402 (i.e., the primary reconstitution programs 403). In block 730, the recovery manager 370, using the steganographic system 380 and other systems, retrieves, decrypts, and decompresses the stored recovery information. In block 740, the recovery manager 370 restores the recovery information to the portions of the LAN 100 that were damaged by the IW attack, and executes the primary reconstitution programs 403. In block 750, the recovery manager 370 restores messaging services as needed. Finally, in block 760, the recovery manager 370 notifies LAN 100 users that recovery operations are in progress. The recovery manager 370 then moves to post-IW attack secondary restoration operations, block 780.

Following an IW attack messaging in the LAN 100 may experience gaps, or may stall. As noted above, the messaging manager 440, in routine 640 identifies stalled message streams and message streams that have gaps. FIG. 9B is a flowchart illustrating the routine 750 to restore messaging services. In block 751, the messaging manager 440 retrieves affected message streams for the time period affected by the IW attack. In block 753, the messaging manager 440 verifies links to the nodes indicated in the related message stream are available to retransmit the messages. In block 755, the messaging manager 440 verifies that the affected nodes are active and are being monitored by the service manager 310 and the agent manager 320. In block 756, the messaging manager 440 verifies that transport mechanisms are functioning to transmit the messages in the LAN 100. In block 757, the messaging manager 440 consults the LDAP database 446 to verify the proper address of the nodes to receive the messages. In block 759, the messaging manager 440 transmits the affected related message stream (or portions thereof) to the appropriate nodes in the LAN 100.

FIG. 9C is a flowchart illustrating secondary post-IW attack reconstitution routine 780. In FIG. 9C, the recovery manager 370 establishes network interconnections in the LAN 100 as needed, and informs the connected systems of the recovery, block 781. In block 782, the recovery manager 370 invokes secondary reconstitution routines 404. In block 783, the recovery manager 370 clears all system recovery flags so that all recovery operations are complete, and normal operation of the LAN 100 can recommence. The routine 780 then returns to pre-IW attack 500.

We claim:

1. A method for real-time network-based recovery from information warfare (IW) attacks on a network comprising subnets, each subnet comprising nodes, the method executed by a computer including a processor and a memory and comprising:

executing, utilizing the processor and the memory, a pre-IW attack routine to identify IW attack recovery information, wherein the recovery information is used during a response to an IW attack to restore the network to a full operational status, the pre-IW attack routine comprising:

discovering recovery information in the network,
collecting the discovered recovery information, and
processing the collected recovery information, wherein the processing, comprises:

insulating the collected recovery information from the IW attacks on parts of the network by embedding the recovery information in digitally represented information including a host image, wherein embedding the recovery information in the digitally represented information including a host image produces an altered host image and enables the recovery information to be determined by comparing the altered host image to the host image, recording timing of events in the network, and
monitoring the network for attack indications;

in response to an IW attack, executing, utilizing the processor and the memory, an IW attack response routine; and executing, utilizing the processor and the memory, a real-time network-based recovery routine.

2. The method of claim 1, wherein monitoring the network for attack indications, comprises:

monitoring a condition of data in the network, wherein a network condition flag is set to indicate the IW attack;
monitoring a condition of data at each of the subnets in the network, wherein a subnet condition flag is set to indicate the IW attack occurring at a specific subnet; and
monitoring a condition of data at each of the nodes in each of the subnets, wherein a node condition flag is set to indicate the IW attack at a specific node in the specific subnet.

3. The method of claim 2, wherein:
a condition flag set to 0 implies full operational capability;
a condition flag set to 1 implies recent IW attack or IW attack in progress; and
a condition flag set to 2 implies recovery from the IW attack.

4. The method of claim 2, wherein the condition flag is set based on a comparison of a user profile and performance parameters.

5. The method of claim 4, further comprising:
collecting performance parameters from a node;
summarizing the collected node performance parameters;
generating a user profile representing steady-state operation of the node;
collecting additional node performance parameters;
comparing the additional node performance parameters and the user profile; and
setting the node condition flag to 1 when the node performance parameters exceed a set of criteria.

6. The method of claim 5, further comprising hiding the user profile and the additional performance parameters in a digital file.

7. The method of claim 5, further comprising:
upon setting the node condition flag to 1, receiving a prompt at a message manager;
comparing the prompt to a series of status and action messages, wherein action messages comprise commands;
selecting one or more appropriate status messages and action messages based on the comparison; and
sending the selected messages to the node.

8. The method of claim 7, further comprising, when an action message is received at a node in the computer network, carrying out the command.

9. The method of claim 5, wherein the set of criteria include performance parameters that exceed the user profile.

10. The method of claim 5, wherein the set of criteria include performance parameters that, in relationship to other collected and summarized performance parameters, indicate an unusual pattern of operation of the node.

11. The method of claim 5, wherein the user profile comprises a steady-state indication of operation of the node.

12. A method for monitoring a computer network to detect an information warfare (LW) attack, the computer network comprising subnets, the subnets comprising nodes, the method executed by a computer including a processor and a memory and comprising:
monitoring, utilizing the processor and the memory, the network to determine a network data condition;
monitoring, utilizing the processor and the memory, the subnets to determine subnet data conditions;
monitoring, utilizing the processor and the memory, the nodes to determine node data conditions;
collecting, utilizing the processor and the memory, recovery information to be used during a response to the IW attack to restore the computer network to a full operational status;
insulating, utilizing the processor and the memory, the collected recovery information from the IW attack on parts of the network by embedding the recovery information in digitally represented information including a host image, wherein embedding the recovery information in the digitally represented information including a host image produces an altered host image and enables the recovery information to be determined by comparing the altered host image to the host image;
determining, utilizing the processor and the memory, the extent of damage from the IW attack, comprising checking on operations on selected data from nodes and subnets to determine if any data corruption or other damage may have occurred in the network;
setting, utilizing the processor and the memory, condition flags indicative of data conditions at the network, subnets and nodes, comprising:
setting a condition flag to 0 when an entity is operational,
setting the condition flag to 1 when the entity has recently experienced the IW attack, or being attacked, and
setting the condition flag to 2 when the entity is recovering from the IW attack wherein when any condition flag is set to 1;
selecting, utilizing the processor and the memory, recovery routines based on the extent of damage; and
executing, utilizing the processor and the memory, the selected recovery routines, including restoring messaging in the network.

13. The method of claim 12, wherein setting the condition flags, comprises:
setting node condition flags for each node in a subnet;
setting subnet condition flags for each subnet in the network; and
setting a network condition flag.

14. A method for describing a condition of a computer network susceptible to an information warfare (IW) attack, the network comprising subnets, each of the subnets comprising nodes, the method, comprising:
monitoring, utilizing the processor and the memory, the network, the subnets, and the nodes;
collecting, utilizing the processor and the memory, recovery information to be used during a response to the IW attack to restore the network to a full operational status;
insulating, utilizing the processor and the memory, the collected recovery information from the IW attack on parts of the network by embedding the recovery information in digitally represented information including a host image, wherein embedding the recovery information in the digitally represented information including a host image produces an altered host image and enables the recovery information to be determined by comparing the altered host image to the host image;
determining, utilizing the processor and the memory, the extent of damage from the IW attack, comprising checking on operations on selected data from nodes and subnets to determine if any data corruption or other damage may have occurred in the network;
setting, utilizing the processor and the memory, condition flags upon a change in status at one or more of the network, the subnets, and the nodes, comprising:
setting a network condition flag,
setting subnet condition flags, and
setting node condition flags, wherein:
a setting of 0 indicates operational status,
a setting of 1 indicates IW attack, and
a setting of 2 indicates recovery from the IW attack; and
invoking, utilizing the processor and the memory, real-time network-based recovery routines based on the setting of the condition flags.

15. An apparatus for real-time network-based recovery from an information warfare (LW) attack on a network comprising subnets, the subnets comprising nodes, the apparatus, comprising:
a service manager that discovers available information for recovery from the IW attack;
a data analyzer that determines required recovery information based on the available information, the recovery information is used during a response to the IW attack to restore the network to a full operational status;
an agent manager that collects the required recovery information;
a steganographic system that insulates the collected recovery information from the IW attack on parts of the network by embedding the recovery information in digitally represented information including a host image, wherein embedding the recovery information in the digitally represented information including a host image produces an altered host image and enables the recovery information to be determined by comparing the altered host image to the host image;
a damage assessment module that determines the extent of damage from the IW attack by checking on operations on selected data from nodes and subnets to determine if any data corruption or other damage may have occurred in the network;
condition flags at each of the network, the subnets and the nodes; and
a recovery manager that invokes recovery routines in an event of the IW attack, the recovery manager including a detection manager that determines conditions on each of the network, the subnets, and the nodes, wherein the conditions indicate one of operational, under IW attack, and recovery from IW attack, wherein the detection manager reads the condition flags set at each of the network, the subnets and the nodes.

16. The apparatus of claim 15, further comprising:
a recovery system that comprises recovery routines for real-time network-based recovery from the IW attack; and
a messaging manager that determines messaging errors as a result of the IW attacks, and reconstitutes network messaging.

17. A computer readable physical medium for use in a computer network comprising subnets, the subnets comprising nodes, the computer readable medium comprising instructions for execution on a processor to accomplish the following steps:

executing a pre-IW attack routine to identify IW attack recovery information, the recovery information is used during a response to an IW attack to restore the network to a full operational status, the pre-IW attack routine; comprising:

discovering recovery information in the network, collecting the discovered recovery information, and processing the collected recovery information, wherein the processing; comprises:

insulating the collected recovery information from IW attacks on parts of the network by embedding the recovery information in digitally represented information including a host image, wherein embedding the recovery information in the digitally represented information including a host image produces an altered host image and enables the recovery information to be determined by comparing the altered host image to the host image recording timing of events in the network, and monitoring the network for attack indications;

in response to an IW attack, executing an IW attack response routine; and executing a real-time network-based recovery routine.

18. The computer readable medium of claim 17, wherein monitoring the network for attack indications, comprises:

monitoring a condition of data in the network, wherein a network condition flag is set to indicate the IW attack;

monitoring a condition of data at each of the subnets in the network, wherein a subnet condition flag is set to indicate the IW attack occurring at a specific subnet; and monitoring a condition of data at each of the nodes in each of the subnets, wherein a node condition flag is set to indicate the IW attack at a specific node in the specific subnet.

19. The computer readable medium of claim 18, wherein:

a condition flag set to 0 implies full operational capability;

a condition flag set to 1 implies recent IW attack or IW attack in progress; and a condition flag set to 2 implies recovery from the IW attack.

20. The computer readable of claim 18, wherein the condition flag is set based on a comparison of a user profile and performance parameters.

21. The computer readable medium of claim 20, wherein execution of the instructions further comprises:

collecting performance parameters from a node;

summarizing the collected node performance parameters;

generating a user profile representing steady-state operation of the node;

collecting additional node performance parameters;

comparing the additional node performance parameters and the user profile; and setting the node condition flag to 1 when the node performance parameters exceed a set of criteria.

22. The computer readable medium of claim 20, wherein execution of the instructions further comprises hiding the user profile and the additional performance parameters in a digital file.

23. The computer readable medium of claim 20, wherein execution of the instructions further comprises:

upon setting the node condition flag to 1, receiving a prompt at a message manager;

comparing the prompt to a series of status and action messages, wherein action messages comprise commands;

selecting one or more appropriate status messages and action messages based on the comparison; and sending the selected messages to the node.

24. The computer readable medium of claim 23, wherein execution of the instructions further comprises, when an action message is received at a node in the computer network, carrying out the command.

25. The computer readable medium of claim 20, wherein the set of criteria include performance parameters that exceed the user profile.

26. The computer readable medium of claim 20, wherein the set of criteria include performance parameters that, in relationship to other collected and summarized performance parameters, indicate an unusual pattern of operation of the node.

27. The computer readable medium of claim 20, wherein the user profile comprises a steady-state indication of operation of the node.

* * * * *